(12) United States Patent
Suzuki et al.

(10) Patent No.: US 9,876,624 B2
(45) Date of Patent: Jan. 23, 2018

(54) TERMINAL DEVICE, INTEGRATED CIRCUIT, AND RADIO COMMUNICATION METHOD

(71) Applicant: Sharp Kabushiki Kaisha, Sakai-shi, Osaka (JP)

(72) Inventors: Shoichi Suzuki, Sakai (JP); Tatsushi Aiba, Sakai (JP); Toshizo Nogami, Sakai (JP); Kimihiko Imamura, Sakai (JP); Kazunari Yokomakura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 36 days.

(21) Appl. No.: 15/119,435

(22) PCT Filed: Feb. 20, 2015

(86) PCT No.: PCT/JP2015/054794
§ 371 (c)(1),
(2) Date: Aug. 17, 2016

(87) PCT Pub. No.: WO2015/125919
PCT Pub. Date: Aug. 27, 2015

(65) Prior Publication Data
US 2017/0012757 A1    Jan. 12, 2017

(30) Foreign Application Priority Data
Feb. 24, 2014  (JP) ................................ 2014-033074

(51) Int. Cl.
*H04W 4/00*  (2009.01)
*H04L 5/00*  (2006.01)
(Continued)

(52) U.S. Cl.
CPC .......... *H04L 5/0057* (2013.01); *H04L 1/0026* (2013.01); *H04L 1/1861* (2013.01);
(Continued)

(58) Field of Classification Search
CPC ............... H04L 1/1861; H04L 5/0055; H04W 72/0413; H04W 72/1226
See application file for complete search history.

(56) References Cited

U.S. PATENT DOCUMENTS

2012/0201154 A1    8/2012  Chandrasekhar et al.
2013/0242824 A1*   9/2013  Lee ....................... H04L 1/1819
                                                             370/281
(Continued)

FOREIGN PATENT DOCUMENTS

EP           2 642 674 A2    9/2013

OTHER PUBLICATIONS

Ericsson et al., "On standardization impact of TDD UL-DL adaptation", 3GPP TSG-RAN WG1 #69, R1-122016, May 21-25, 2012, pp. 1-3.
(Continued)

*Primary Examiner* — Ian N Moore
*Assistant Examiner* — Phong La
(74) *Attorney, Agent, or Firm* — Keating & Bennett, LLP

(57) ABSTRACT

For aperiodic reporting of CSI, $n_{CQI\ ref}$ is four, and a subframe $n-n_{CQI\ ref}$ corresponds to a valid subframe. A subframe that satisfies a criteria including at least a criterion (i) is regarded as being valid. In the criterion (i), in a case where third information for a radio frame is detected, an UL-DL configuration for the radio frame is given by the third information for the radio frame, and in a case where the third information for the radio frame is not detected, the UL-DL configuration for the radio frame is given by first information. The criterion (i) stipulates that the subframe is a subframe indicated as a DL subframe or a special subframe by the UL-DL configuration for the radio frame. In a case where a subframe n-4 is not a valid subframe for aperiodic reporting of channel state information, the reporting of the CSI is omitted in the subframe n.

3 Claims, 22 Drawing Sheets

(51) Int. Cl.
  *H04W 72/12* (2009.01)
  *H04L 1/18* (2006.01)
  *H04W 72/04* (2009.01)
  *H04L 1/00* (2006.01)
  *H04W 24/10* (2009.01)

(52) U.S. Cl.
  CPC ........... *H04L 5/0055* (2013.01); *H04W 24/10* (2013.01); *H04W 72/0413* (2013.01); *H04W 72/1226* (2013.01); *H04W 72/042* (2013.01)

(56) References Cited

U.S. PATENT DOCUMENTS

| | | | |
|---|---|---|---|
| 2015/0131568 A1* | 5/2015 | You | H04L 5/001 370/329 |
| 2016/0050648 A1* | 2/2016 | Seo | H04B 7/0626 370/329 |
| 2016/0135070 A1* | 5/2016 | Lee | H04L 5/0053 370/252 |
| 2017/0170940 A1* | 6/2017 | Lee | H04L 5/0057 |
| 2017/0273027 A1* | 9/2017 | Kim | H04W 52/146 |
| 2017/0289852 A1* | 10/2017 | Yang | H04W 28/18 |

OTHER PUBLICATIONS

Ericsson et al., "Signalling support for dynamic TDD", 3GPP TSG-RAN WG1 #72, R1-130558, Jan. 28-Feb. 1, 2013, 3 pages.
"3rd Generation Partnership Project; Technical Specification Group Radio Access Network; Evolved Universal Terrestrial Radio Access (E-UTRA); Physical layer procedures (Release 11)," 3GPP TS 36.213 V11.2.0, Feb. 2013, pp. 1-173.

* cited by examiner

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 9

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 14

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U or D |
| (c) | S | S or D |

FIG. 15

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U or D |
| (g) | S | S | S |
| (h) | S | D | S or D |

FIG. 16

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
| --- | --- | --- |
| 0 | 0 | - (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | - (1) |
| 1 | 2 | 1, 2 |
| 1 | 4 | 1, 4 |
| 1 | 5 | 1, 2, 4, 5 |
| 2 | 2 | - (2) |
| 2 | 5 | 2, 5 |
| 3 | 3 | - (3) |
| 3 | 4 | 3, 4 |
| 3 | 5 | 3, 4, 5 |
| 4 | 4 | - (4) |
| 4 | 5 | 4, 5 |
| 5 | 5 | - (5) |
| 6 | 6 | - (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 17

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 21

| CQI INDEX | MODULATION | CODING RATE × 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 22

| RADIO FRAME NUMBER | 0 | | | | | | | | | | 1 | | | | | | | | | |
|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 |
| SUBFRAME SET | a | a | — | b | b | a | a | — | b | a | a | a | — | b | b | a | a | — | b | a |
| UPLINK REFERENCE UL-DL CONFIGURATION 0 | D | S | U | U | U | D | S | U | U | U | D | S | U | U | U | D | D | U | U | U |
| DOWNLINK REFERENCE UL-DL CONFIGURATION 2 | D | S | U | D | D | D | S | U | D | D | D | S | U | D | D | D | S | U | D | D |
| TRANSMISSION DIRECTION UL-DL CONFIGURATION 1 | D | S | U | U | D | D | S | U | D | D | | | NO VALID UL-DL CONFIGURATION | | | | | | | |
| PERIODIC CSI REPORT | | | | | | | | | | | | | | | | | | P | | |
| CSI REFERENCE RESOURCE | | | | | R | | | | | | | | | | | | | | | |

SUBFRAME THAT APPEARS FOUR OR MORE SUBFRAMES BEFORE SUBFRAME USED FOR REPORTING CSI

FIG. 24

| RADIO FRAME NUMBER | 0 | | | | | | | | | | 1 | | | | | | | | | | |
|---|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 | |
| SUBFRAME SET | a | a | – | b | b | a | a | – | b | a | a | a | – | b | b | a | a | – | b | a | |
| UPLINK REFERENCE UL-DL CONFIGURATION 0 | D | S | U | U | U | D | S | U | U | U | D | S | U | U | U | D | S | U | U | U | |
| DOWNLINK REFERENCE UL-DL CONFIGURATION 2 | D | S | U | D | D | D | S | U | D | D | D | S | U | D | D | D | S | D | D | D | |
| TRANSMISSION DIRECTION UL-DL CONFIGURATION 1 | D | S | U | U | D | D | S | U | D | D | NO VALID UL-DL CONFIGURATION | | | | | | | | | | |
| CSI REQUEST | | | | | | | G | | | | | | A | | | | | | | | |
| APERIODIC CSI REPORT | | | | | | | | | R | | | | | | | | | | | | |
| CSI REFERENCE RESOURCE | | | | | | | | | | | | | | | | | | | | | |

SUBFRAME THAT APPEARS FOUR OR MORE SUBFRAMES BEFORE SUBFRAME USED FOR REPORTING CSI AND THAT IS OR IS LATER THAN SUBFRAME IN WHICH CSI REQUEST IS DETECTED

TERMINAL DEVICE, INTEGRATED CIRCUIT, AND RADIO COMMUNICATION METHOD

TECHNICAL FIELD

The present invention relates to a terminal device, an integrated circuit, and a radio communication method.

This application claims priority based on Japanese Patent Application No. 2014-033074 filed on Feb. 24, 2014, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been considered. In LTE, a base station device is also referred to as an evolved NodeB (eNodeB), and a mobile station device is also referred to as user equipment (UE). LTE is a cellular communication system in which an area is divided into a plurality of cells to form a cellular pattern, each of the cells being served by a base station device. A single base station device may manage a plurality of cells.

LTE supports a time division duplex (TDD). LTE that employs a TDD scheme is also referred to as TD-LTE or LTE TDD. TDD is a technology that enables full duplex communication in a single frequency band by performing time division multiplexing on an uplink signal and a downlink signal.

In the 3GPP, application of a traffic adaptation technology and an interference reduction technology (DL-UL interference management and traffic adaptation) to TD-LTE has been studied. The traffic adaptation technology is configured to enable a ratio of an uplink resource to a downlink resource to change depending on uplink traffic and downlink traffic. The traffic adaptation technology is also referred to as dynamic TDD.

In NPL 1, a method of using a flexible subframe is disclosed as a method of realizing traffic adaptation. The base station device can receive an uplink signal or transmit a downlink signal in the flexible subframe. In NPL 1, as long as the base station device does not instruct the mobile station device to transmit the uplink signal in the flexible subframe, the mobile station device regards the flexible subframe as a downlink subframe.

NPL 1 discloses that hybrid automatic repeat request (HARQ) timing for a physical downlink shared channel (PDSCH) is determined on the basis of newly introduced uplink-downlink configuration, and the HARQ timing for a physical uplink shared channel (PUSCH) is determined on the basis of the first UL-DL configuration.

NPL 2 discloses that (a) a UL/DL reference configuration is introduced and that (b) several subframes are possibly scheduled, for either of uplink and downlink, by dynamic grant/assignment from a scheduler.

In Section 7.2 in NPL 3, a procedure performed by the mobile station device for reporting channel state information (CSI) is disclosed. The base station device allocates a downlink resource to the mobile station device on the basis of the channel state information reported from a plurality of mobile station devices. The channel state information includes a channel quality indicator (CQI).

CITATION LIST

Non Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21-25 May 2012.

NPL 2: "Signalling support for dynamic TDD", R1-130558, Ericsson, ST-Ericsson, 3GPP TSG-RAN WG1 Meeting #72, St Julian's, Malta, 28 Jan.-1 Feb. 2013.

NPL 3: "3GPP TS36.213 v11.2.0 (2013-02)", 15th March February, 2013.

SUMMARY OF INVENTION

Technical Problem

However, in the radio communication system, a technology relating to the channel state information has not been sufficiently studied. In light of the foregoing, an object of the present invention is to provide a terminal device, an integrated circuit, and a radio communication method that enable efficient communication in a radio communication system in which channel state information is used.

Solution to Problem (1) In order to accomplish the object described above, the present invention is contrived to provide the following means. That is, according to an aspect of the present invention, there is provided a terminal device that communicates with a base station device by using a single serving cell. The terminal device includes: a reception unit configured to receive first information indicating an uplink-downlink configuration, second information indicating an uplink-downlink configuration, third information indicating an uplink-downlink configuration, and an uplink grant including a channel state information request to be used to trigger aperiodic reporting of channel state information; a measurement unit configured to derive an index of a channel quality indicator on the basis of a channel state information reference resource, for a value of the channel quality indicator to be reported in a subframe n; and a transmission unit configured to report the channel state information including the channel quality indicator, to transmit a physical uplink shared channel corresponding to detection of a physical downlink control channel, with reference to the uplink-downlink configuration indicated by the first information, and to transmit a hybrid automatic repeat request acknowledgement (HARQ-ACK) corresponding to detection of a physical downlink shared channel, with reference to the uplink-downlink configuration indicated by the second information. In such a terminal device, in a time domain, the channel state information reference resource is defined by a subframe $n-n_{CQI\ ref}$; for periodic reporting of the channel state information, the $n_{CQI\ ref}$ is the smallest value that is equal to or greater than four so that the subframe $n-n_{CQI\ ref}$ corresponds to a valid subframe; and for aperiodic reporting of the channel state information, the $n_{CQI\ ref}$ is four, the subframe $n-n_{CQI\ ref}$ corresponds to a valid subframe, and the subframe $n-n_{CQI\ ref}$ is later than a subframe n-k, the channel state information request corresponding to the subframe $n-n_{CQI\ ref}$ being received in the subframe n-k. A subframe that satisfies criteria including at least a criterion (i) is regarded as being valid; in the criterion (i), in a case where the third information for a radio frame is detected, the uplink-downlink configuration for the radio frame is given by the third information for the radio frame; in the criterion (i), in a case where the third information for the radio frame is not detected, the uplink-downlink configuration for the radio frame is given by the first information; the criterion (i) stipulates that the subframe is a subframe indicated as a downlink subframe or a special subframe by the uplink-downlink configuration for the radio frame; and in a case where a subframe n−4 is not the valid subframe for the aperiodic reporting of the channel state information, reporting of the channel state information is omitted in the subframe n.

(2) Furthermore, according to an aspect of the present invention, there is provided a radio communication method used for a terminal device that communicates with a base station device by using a single serving cell. The radio communication method includes: receiving first information indicating an uplink-downlink configuration, second information indicating an uplink-downlink configuration, third information indicating an uplink-downlink configuration, and an uplink grant including a channel state information request to be used to trigger aperiodic reporting of channel state information; deriving an index of a channel quality indicator on the basis of a channel state information reference resource, for a value of the channel quality indicator to be reported in a subframe n; reporting the channel state information including the channel quality indicator; transmitting a physical uplink shared channel corresponding to detection of a physical downlink control channel, with reference to the uplink-downlink configuration indicated by the first information; and transmitting a hybrid automatic repeat request acknowledgement (HARQ-ACK) corresponding to detection of a physical downlink shared channel, with reference to the uplink-downlink configuration indicated by the second information. In such a method, in a time domain, the channel state information reference resource is defined by a subframe $n-n_{CQI\ ref}$; for periodic reporting of the channel state information, the $n_{CQI\ ref}$ is the smallest value that is equal to or greater than four so that the subframe $n-n_{CQI\ ref}$ corresponds to a valid subframe; and for aperiodic reporting of the channel state information report, the $n_{CQI\ ref}$ is four, the subframe $n-n_{CQI\ ref}$ corresponds to a valid subframe, and the subframe $n-n_{CQI\ ref}$ is later than a subframe n−k, the channel state information request corresponding to the subframe $n-n_{CQI\ ref}$ being received in the subframe n−k; a subframe that satisfies criteria including at least a criterion (i) is regarded as being valid; in the criterion (i), in a case where the third information for a radio frame is detected, the uplink-downlink configuration for the radio frame is given by the third information for the radio frame; in the criterion (i), in a case where the third information for the radio frame is not detected, the uplink-downlink configuration for the radio frame is given by the first information; the criterion (i) stipulates that the subframe is a subframe indicated as a downlink subframe or a special subframe by the uplink-downlink configuration for the radio frame; and in a case where a subframe n−4 is not the valid subframe for the aperiodic reporting of the channel state information, reporting of the channel state information is omitted in the subframe n.

(3) Furthermore, according to an aspect of the present invention, there is provided an integrated circuit incorporated into a terminal device that communicates with a base station device by using a single serving cell. The integrated circuit causes the terminal device to perform a series of functions including: receiving first information indicating an uplink-downlink configuration, second information indicating an uplink-downlink configuration, third information indicating an uplink-downlink configuration, and an uplink grant including a channel state information request to be used to trigger aperiodic reporting of channel state information; deriving an index of a channel quality indicator on the basis of a channel state information reference resource, for a value of the channel quality indicator to be reported in a subframe n; reporting the channel state information including the channel quality indicator; transmitting a physical uplink shared channel corresponding to detection of a physical downlink control channel, with reference to the uplink-downlink configuration indicated by the first information; and transmitting a hybrid automatic repeat request acknowledgement (HARQ-ACK) corresponding to detection of a physical downlink shared channel, with reference to the uplink-downlink configuration indicated by the second information, in which, in a time domain, the channel state information reference resource is defined by a subframe $n-n_{CQI\ ref}$; for periodic reporting of the channel state information, the $n_{CQI\ ref}$ is the smallest value that is equal to or greater than four so that the subframe $n-n_{CQI\ ref}$ corresponds to a valid subframe; and for aperiodic reporting of the channel state information report, the $n_{CQI\ ref}$ is four, the subframe $n-n_{CQI\ ref}$ corresponds to a valid subframe, and the subframe $n-n_{CQI\ ref}$ is later than a subframe n−k, the channel state information request corresponding to the subframe $n-n_{CQI\ ref}$ being received in the subframe n−k; a subframe that satisfies criteria including at least a criterion (i) is regarded as being valid; in the criterion (i), in a case where the third information for a radio frame is detected, the uplink-downlink configuration for the radio frame is given by the third information for the radio frame; in the criterion (i), in a case where the third information for the radio frame is not detected, the uplink-downlink configuration for the radio frame is given by the first information; the criterion (i) stipulates that the subframe is a subframe indicated as a downlink subframe or a special subframe by the uplink-downlink configuration for the radio frame; and in a case where a subframe n−4 is not the valid subframe for the aperiodic reporting of the channel state information, reporting of the channel state information is omitted in the subframe n.

Advantageous Effects of Invention

According to this invention, a mobile station device and a base station device can efficiently communicate with each other in radio communication in which channel state information is used.

BRIEF DESCRIPTION OF DRAWINGS

FIG. 9 is a diagram illustrating one example of an uplink-downlink configuration according to the present embodiment.

FIG. 12 is a diagram illustrating a correspondence between a pair formed by the first uplink reference UL-DL configuration for a different serving cell (a primary cell) and the first uplink reference UL-DL configuration for a serving cell (a secondary cell), and a second uplink reference UL-DL configuration for the secondary cell, according to the present embodiment.

FIG. 14 is a diagram illustrating a correspondence between a pair formed by the first downlink reference UL-DL configuration for the primary cell and the first downlink reference UL-DL configuration for the secondary cell, and the second downlink reference UL-DL configuration for the secondary cell, according to the present embodiment.

FIG. 15 is a diagram illustrating a relationship between a subframe indicated by the first uplink reference UL-DL configuration and a subframe indicated by the first downlink reference UL-DL configuration, according to the present embodiment.

FIG. 16 is a diagram illustrating a relationship among the subframe indicated by the first uplink reference UL-DL configuration, the subframe indicated by the first downlink reference UL-DL configuration, and a subframe indicated by a transmission direction UL-DL configuration, according to the present embodiment.

FIG. 17 is a diagram illustrating a relationship among the first uplink reference UL-DL configuration, the first downlink reference UL-DL configuration, and the transmission direction UL-DL configuration, according to the present embodiment.

FIG. 18 is a diagram illustrating a correspondence between subframe n to which a PDCCH/EPDCCH/PHICH is allocated and subframe n+k to which the PUSCH that the PDCCH/EPDCCH/PHICH corresponds to is allocated, according to the present embodiment.

FIG. 19 is a diagram illustrating a correspondence between subframe n to which the PHICH is allocated and subframe n−k to which the PUSCH that the PHICH corresponds to is allocated, according to the present embodiment.

FIG. 20 is a diagram illustrating a correspondence between subframe n to which the PUSCH is allocated and subframe n+k to which the PHICH that the PUSCH corresponds to is allocated, according to the present embodiment. The mobile station device 1 specifies (selects or determines) a value k in accordance with the table in FIG. 20.

FIG. 21 is a diagram illustrating a correspondence between subframe n−k to which the PDSCH is allocated and subframe n used to transmit an HARQ-ACK that the PDSCH corresponds to, according to the present embodiment.

FIG. 22 is a table showing a modulation scheme and a coding rate that correspond to a CQI index according to the present embodiment.

FIG. 24 is a diagram illustrating one example of mapping of a URS, a CRS, and a control signal (PDCCH/PHICH/PCFICH) according to the present embodiment.

FIG. 25 is a diagram illustrating one example of the mapping of the URS according to the present embodiment.

DESCRIPTION OF EMBODIMENT

An embodiment of the present invention will be described below.

According to the present embodiment, a plurality of cells are set for a mobile station device. A technology in which a mobile station device performs communication by using the plurality of cells is referred to as cell aggregation or carrier aggregation. The present invention may be applied to each of the cells set for the mobile station device. Furthermore, the present invention may be applied to some of the set plurality of cells. The cell set for the mobile station device is also referred to as a serving cell.

The set plurality of serving cells include one primary cell and one or a plurality of secondary cells. The primary cell is a serving cell in which an initial connection establishment procedure has been performed, a serving cell in which a connection re-establishment procedure has been started, or a cell indicated as a primary cell during a handover procedure. At a point of time when a radio resource control (RRC) connection is established, or later, a secondary cell may be set.

A time division duplex (TDD) scheme is applied to a radio communication system according to the present embodiment. In a case of cell aggregation, the TDD scheme may be applied to all of the plurality of cells. Furthermore, in the case of cell aggregation, a cell to which the TDD scheme is applied and a cell to which a frequency division duplex (FDD) scheme is applied may be aggregated. In a case where the cell to which the TDD is applied and the cell to which the FDD is applied are aggregated, the present invention can be applied to the cell to which the TDD is applied.

The mobile station device transmits information, indicating a combination of bands in which carrier aggregation is supported by the mobile station device, to the base station device. For each combination of bands, the mobile station device transmits information indicating whether or not simultaneous transmission and reception in the plurality of serving cells in the plurality of different bands are supported, to the base station device.

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
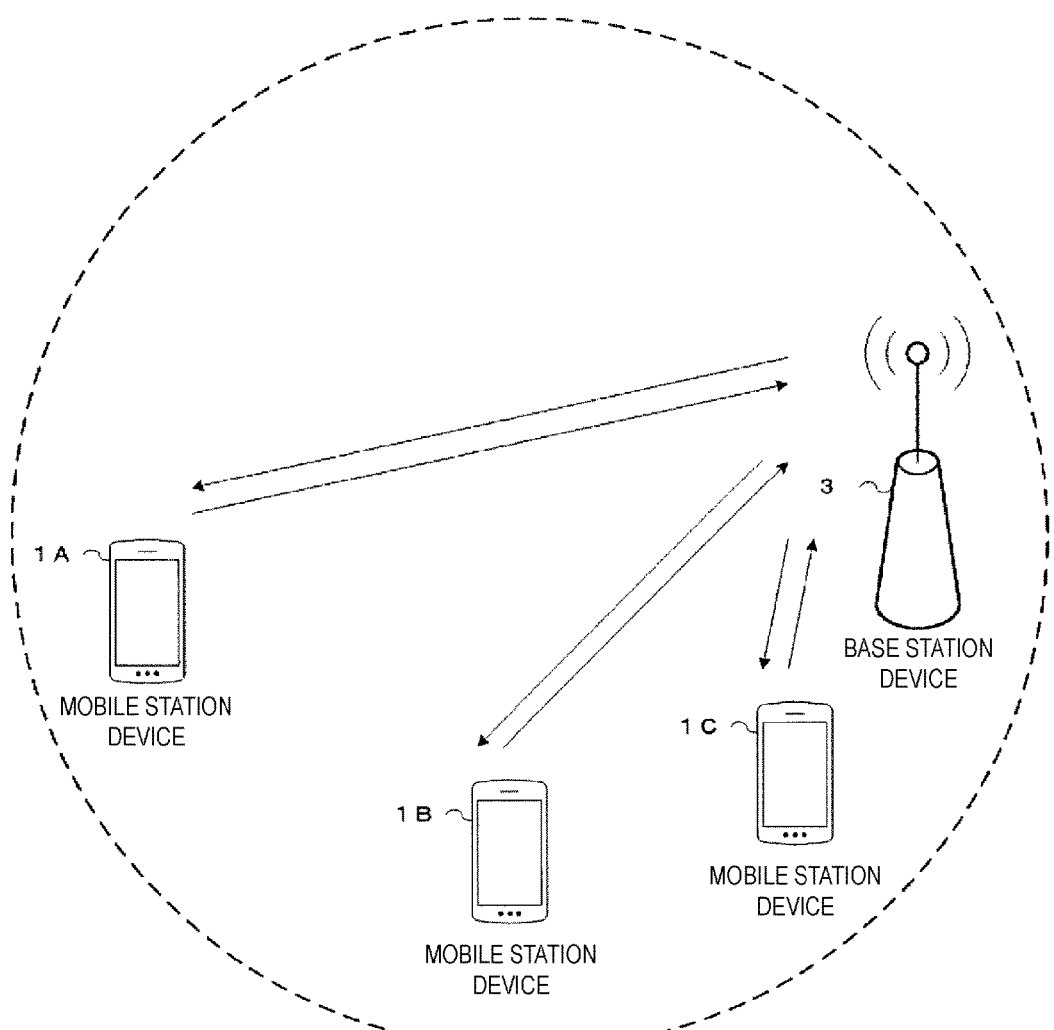
FIG. 1 is a conceptual diagram of a radio communication system according to the present embodiment.

FIG. 1 is a conceptual diagram of the radio communication system according to the present embodiment. In FIG. 1, the radio communication system includes mobile station devices 1A to 1C and a base station device 3. The mobile station devices 1A to 1C are each hereinafter referred to as a mobile station device 1.

A physical channel and a physical signal according to the present embodiment are described.

In FIG. 1, in uplink radio communication from the mobile station device 1 to the base station device 3, the following uplink physical channels are used. The uplink physical channel is used to transmit information output from a higher layer.

Physical uplink control channel (PUCCH)
Physical uplink shared channel (PUSCH)
Physical random access channel (PRACH)

The PUCCH is a physical channel that is used to transmit uplink control information (UCI). The pieces of uplink control information include downlink channel state information (CSI), a scheduling request (SR) indicating a request for a PUSCH resource, and an acknowledgement (ACK)/negative-acknowledgement (NACK) for downlink data (a transport block or a downlink-shared channel (DL-SCH)). The ACK/NACK is also referred to as an HARQ-ACK or HARQ feedback, or response information.

The PUSCH is a physical channel that is used to transmit uplink data (uplink-shared channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is a physical channel that is used to transmit a random access preamble. A main object of the PRACH is to synchronize the mobile station device 1 to the base station device 3 in terms of a time domain. In addition, the PRACH is also used for the initial connection establishment procedure, the handover procedure, the connection re-establishment procedure, synchronization (timing adjustment) for uplink transmission, and the request for the PUSCH resource.

In FIG. 1, the following uplink physical signals are used for the uplink radio communication. The uplink physical signal is not used to transmit information output from the higher layer, but is used by a physical layer.

Uplink reference signal (UL RS)

According to the present embodiment, the following two types of uplink reference signals are used.

Demodulation reference signal (DMRS)
Sounding reference signal (SRS)

The DMRS relates to transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to as transmission of the PUCCH.

The SRS has no relationship with the transmission of the PUSCH or the PUCCH. The base station device 3 uses the SRS in order to measure an uplink channel state. The mobile station device 1 transmits a first SRS in a first resource set by the higher layer. Additionally, upon receiving information indicating a request for transmission of the SRS on the PDCCH, the mobile station device 1 transmits a second SRS only one time in a second resource set by the higher layer. The first SRS is also referred to as a periodic SRS or a trigger type 0 SRS. The second SRS is also referred to as an aperiodic SRS or a trigger type 1 SRS. Transmission of the aperiodic SRS is scheduled by the information indicating a request for transmission of the SRS.

In FIG. 1, the following downlink physical channels are used for downlink radio communication from the base station device 3 to the mobile station device 1. The downlink physical channel is used to transmit the information output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB), or a broadcast channel (BCH), that is shared by the mobile station devices 1. The MIB is transmitted at intervals of 40 ms, and, within the interval, the MIB is repeatedly transmitted every 10 ms. Specifically, initial transmission of the MIB is performed in subframe 0 in a radio frame that satisfies SFN mod 4=0, and re-transmission (repetition) of the MIB is performed in subframes 0 in all the other radio frames. A system frame number (SFN) is a radio frame number. The MIB is system information. For example, the MIB includes information indicating the SFN.

The PCFICH is used to transmit information indicating a region (OFDM symbols) to be used for transmission of the PDCCH.

The PHICH is used to transmit an HARQ indicator (the HARQ feedback or the response information) indicating an acknowledgement (ACK) or a negative acknowledgement (NACK) with respect to the uplink data (uplink shared channel (UL-SCH)) received by the base station device 3. For example, in a case where the mobile station device 1 receives the HARQ indicator indicating the ACK, the corresponding uplink data is not re-transmitted. For example, in a case where the mobile station device 1 receives the HARQ indicator indicating the NACK, the corresponding uplink data is re-transmitted. The HARQ indicator for a single piece of uplink data is transmitted on a single PHICH. The base station device 3 transmits HARQ indicators for a plurality of pieces of uplink data included in the same PUSCH, on a plurality of respective PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling of a single PDSCH within a single cell. The downlink grant is used for the scheduling of the PDSCH within the same subframe as the subframe on which the downlink grant is transmitted. The uplink grant is used for scheduling of a single PUSCH within a single cell. The uplink grant is used for the scheduling of a single PUSCH within the fourth or later subframe after the subframe in which the uplink grant is transmitted.

Cyclic redundancy check (CRC) parity bits are attached to the DCI format. The CRC parity bits are scrambled with a cell-radio network temporary identifier (C-RNTI) or a semi-persistent scheduling cell-radio network temporary identifier (SPS C-RNTI). The C-RNTI and the SPS C-RNTI are identifiers for identifying a mobile station device within a cell.

The C-RNTI is used to control the PDSCH or the PUSCH in a single subframe. The SPS C-RNTI is used to periodically allocate a resource for the PDSCH or the PUSCH.

The PDSCH is used to transmit downlink data (downlink shared channel (DL-SCH)).

The PMCH is used to transmit multicast data (multicast channel (MCH)).

In FIG. 1, in the downlink radio communication, the following downlink physical signals are used. The downlink physical signal is not used to transmit the information output from the higher layer, but is used by the physical layer.

Synchronization signal (SS)
Downlink reference signal (DL RS)

The synchronization signal is used in order for the mobile station device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the mobile station device 1 to perform the channel compensation of the downlink physical channel. The downlink reference signal is used in order for the mobile station device 1 to calculate the downlink channel state information.

According to the present embodiment, the following five types of downlink reference signals are used.

Cell-specific reference signal (CRS)
UE-specific reference signal (URS) relating to the PDSCH
Demodulation reference signal (DMRS) relating to the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted in the entire band of a subframe. The CRS is used to perform demodulation of the PBCH/PDCCH/PHICH/PCFICH/PDSCH. The CRS may be used in order for the mobile station device 1 to calculate the downlink channel state information. The PBCH/PDCCH/PHICH/PCFICH is transmitted on an antenna port used for transmission of the CRS.

The URS relating to the PDSCH is transmitted in a subframe and in a band that are used for transmission of the PDSCH to which the URS relates. The URS is used to demodulate the PDSCH to which the URS relates.

The PDSCH is transmitted on an antenna port used for transmission of the CRS or the URS. A DCI format 1A is used to schedule the PDSCH transmitted on the antenna port used for the transmission of the CRS. A DCI format 2D is used to schedule the PDSCH transmitted on the antenna port used for the transmission of the URS.

The DMRS relating to the EPDCCH is transmitted in a subframe and in a band that are used for transmission of the EPDCCH to which the DMRS relates. The DMRS is used to demodulate the EPDCCH to which the DMRS relates. The EPDCCH is transmitted on an antenna port used for transmission of the DMRS.

The NZP CSI-RS is transmitted in a subframe that is set. A resource in which the NZP CSI-RS is transmitted is set by the base station device. The NZP CSI-RS is used in order for the mobile station device 1 to calculate the downlink channel state information. The mobile station device 1 performs signal measurement (channel measurement), using the NZP CSI-RS.

A resource for the ZP CSI-RS is set by the base station device 3. With zero output, the base station device 3 transmits the ZP CSI-RS. To be more precise, the base station device 3 does not transmit the ZP CSI-RS. The base station device 3 transmits neither the PDSCH nor the EPDCCH in a resource set for the ZP CSI-RS. For example, in a certain cell, the mobile station device 1 can measure interference in a resource to which the NZP CSI-RS corresponds.

The MBSFN RS is transmitted in the entire band of a subframe used for transmission of the PMCH. The MBSFN RS is used to demodulate the PMCH. The PMCH is transmitted on the antenna port used for transmission of the MBSFN RS.

The PRS is used in order for the mobile station device to measure a geographical location of the mobile station device itself.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a medium access control (MAC) layer is referred to as a transport channel. A unit of the transport channel used in the MAC layer is also referred to as a transport block (TB) or a MAC protocol data unit (PDU). Control of a hybrid automatic repeat request (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

A configuration of the radio frame according to the present embodiment will be described below.

Figure 2:
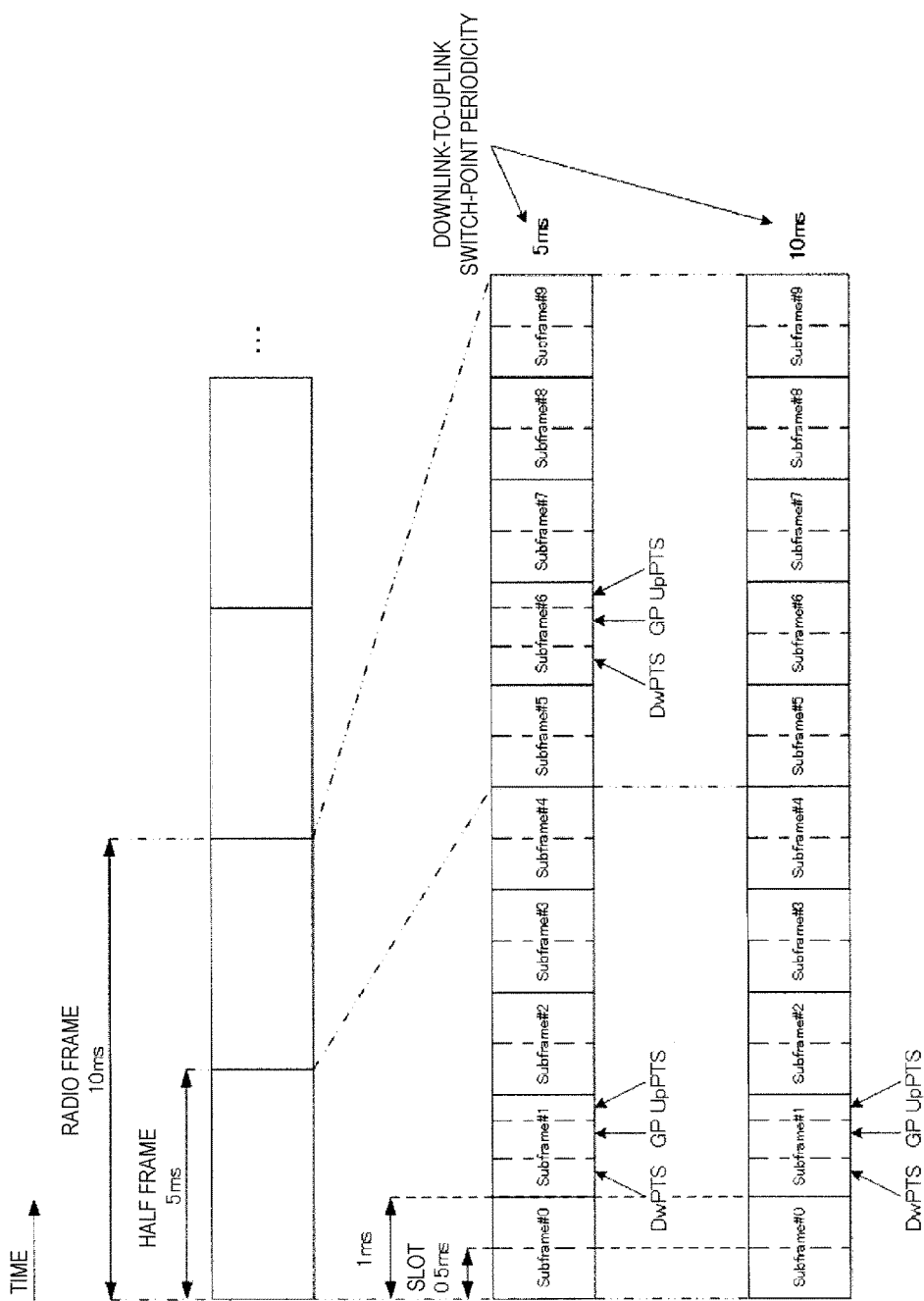
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. In FIG. 2, the horizontal axis is a time axis. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes can be used at each interval of 10 ms.

According to the present embodiment, the following three types of subframes are defined.

Downlink subframe (a first subframe)
Uplink subframe (a second subframe)
Special subframe (a third subframe)

The downlink subframe is a subframe reserved for downlink transmission. The uplink subframe is a subframe reserved for uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted only of the DwPTS and the GP, or may be constituted only of the GP and the UpPTS.

A single radio frame is constituted of at least the downlink subframe, the uplink subframe, and the special subframe.

The radio communication system according to the present embodiment supports 5 ms downlink-to-uplink switch-point periodicity and 10 ms downlink-to-uplink switch-point periodicity. In a case where the downlink-to-uplink switch-point periodicity is 5 ms, both of the half frames within the radio frame include the special subframe. In a case where the downlink-to-uplink switch-point periodicity is 10 ms, only the first half frame within the radio frame includes the special subframe.

A configuration of a slot according to the present embodiment will be described below.

Figure 3:
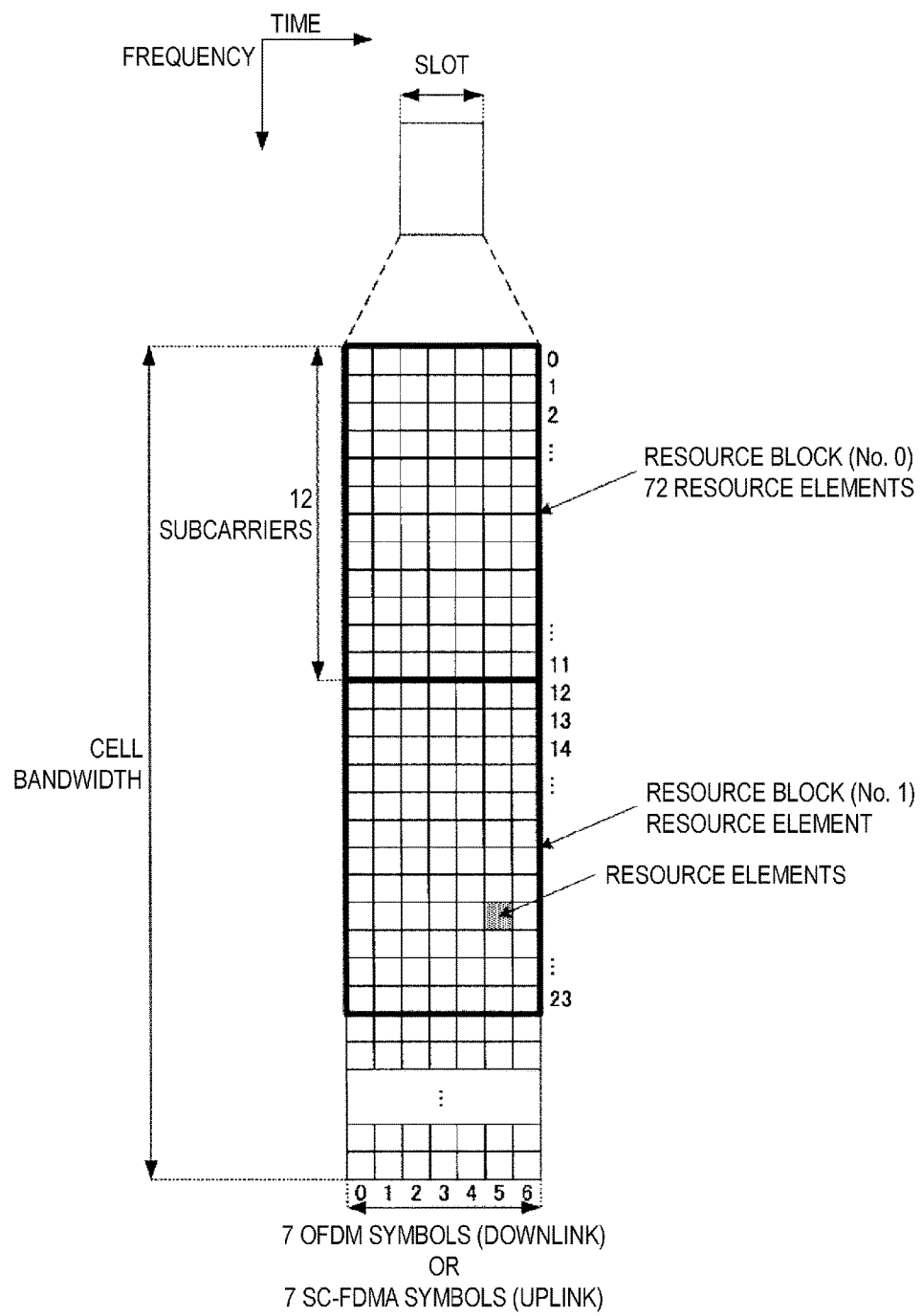
FIG. 3 is a diagram illustrating a configuration of a slot according to the present embodiment.

FIG. 3 is a diagram illustrating the configuration of the slot according to the present embodiment. According to the present embodiment, a normal cyclic prefix (CP) is applied to the OFDM symbol. Moreover, an extended cyclic prefix (CP) may be applied to the OFDM symbol. The physical signal or the physical channel transmitted in each of the slots is expressed by a resource grid. In FIG. 3, the horizontal axis is a time axis, and the vertical axis is a frequency axis. In downlink, the resource grid is defined by a plurality of subcarriers and a plurality of OFDM symbols. In uplink, the resource grid is defined by a plurality of subcarriers and a plurality of SC-FDMA symbols. The number of subcarriers constituting one slot depends on a cell bandwidth. The number of OFDM symbols or SC-FDMA symbols constituting one slot is seven. Each of the elements within the resource grid is referred to as a resource element. The resource element is identified by a subcarrier number, and an OFDM symbol or SC-FDMA symbol number.

A resource block is used to express mapping of a certain physical channel (the PDSCH, the PUSCH, or the like) to resource elements. The resource block is defined by a virtual resource block and a physical resource block. A certain physical channel is first allocated to the virtual resource block. Thereafter, the virtual resource block is mapped to the physical resource block. One physical resource block is defined by seven consecutive OFDM symbols or SC-FDMA symbols in a time domain and by 12 consecutive subcarriers in a frequency domain. Therefore, one physical resource block is constituted of (7×12) resource elements. Furthermore, one physical resource block corresponds to one slot in the time domain and corresponds to 180 kHz in the frequency domain. The physical resource blocks are numbered from 0 in the frequency domain The physical channel and the physical signal that are transmitted in each of the subframes will be described below.

Figure 4:
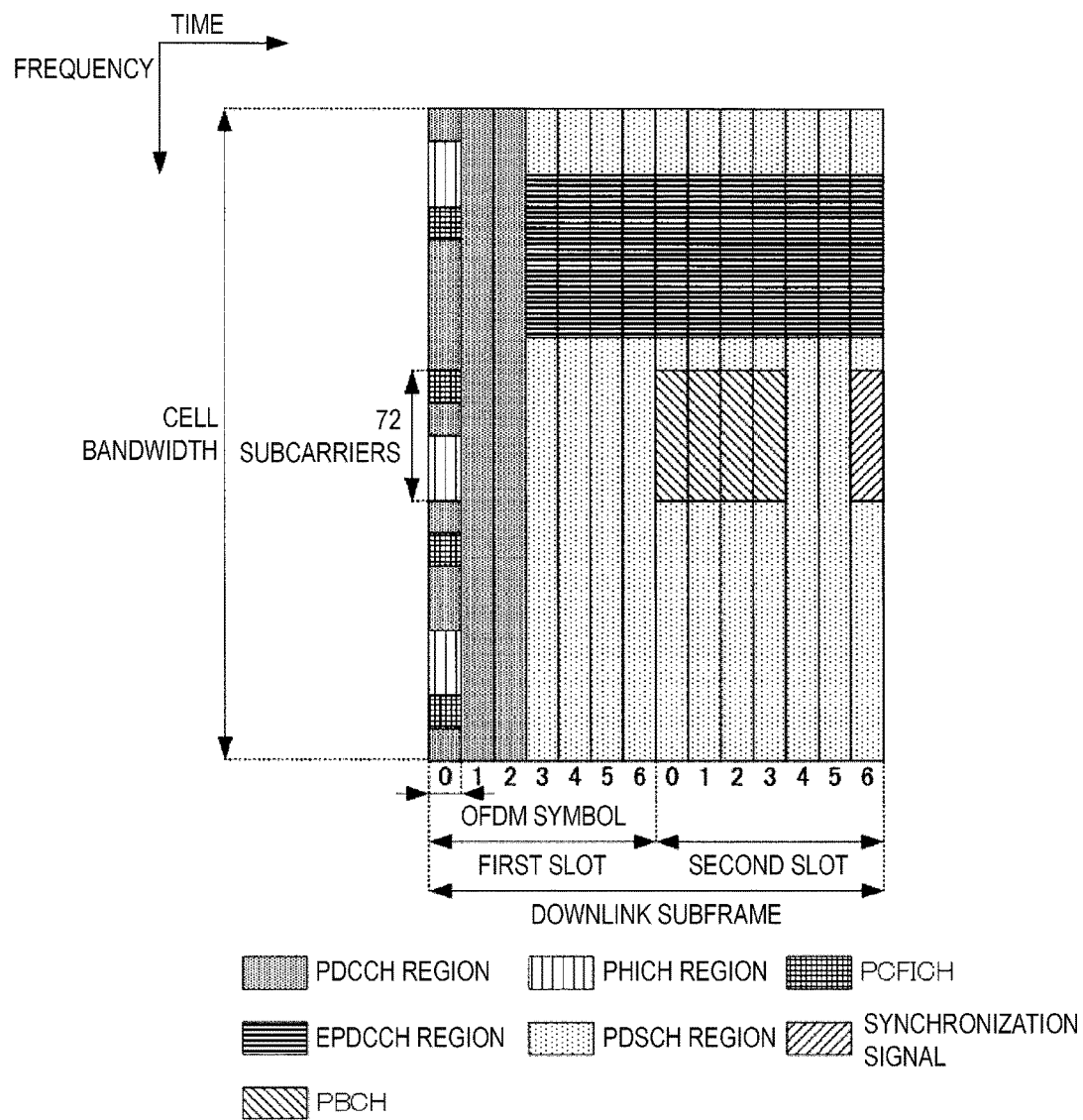
FIG. 4 is a diagram illustrating one example of allocation of a physical channel and mapping of a physical signal to a downlink subframe according to the present embodiment.

FIG. 4 is a diagram illustrating one example of allocation of the physical channel and mapping of the physical signal to the downlink subframe according to the present embodiment. In FIG. 4, the horizontal axis is a time axis, and the vertical axis is a frequency axis. In the downlink subframe, the base station device 3 may transmit the downlink physical channel (the PBCH, the PCFICH, the PHICH, the PDCCH, the EPDCCH, or the PDSCH), and the downlink physical signal (the synchronization signal or the downlink reference signal). Moreover, the PBCH is transmitted only in subframe 0 within the radio frame. Moreover, the downlink reference signal is mapped to the resource elements distributed in the frequency domain and the time domain. The downlink reference signal is not illustrated in FIG. 4 for the sake of simplicity.

A plurality of PDCCHs may be frequency-multiplexed and time-multiplexed in a PDCCH region. A plurality of EPDCCHs may be frequency-multiplexed, time-multiplexed, and spatial-multiplexed in an EPDCCH region. A plurality of PDSCHs may be frequency-multiplexed and spatial-multiplexed in a PDSCH region. The PDCCH and, the PDSCH or the EPDCCH may be time-multiplexed. The PDSCH and the EPDCCH may be frequency-multiplexed.

Figure 5:
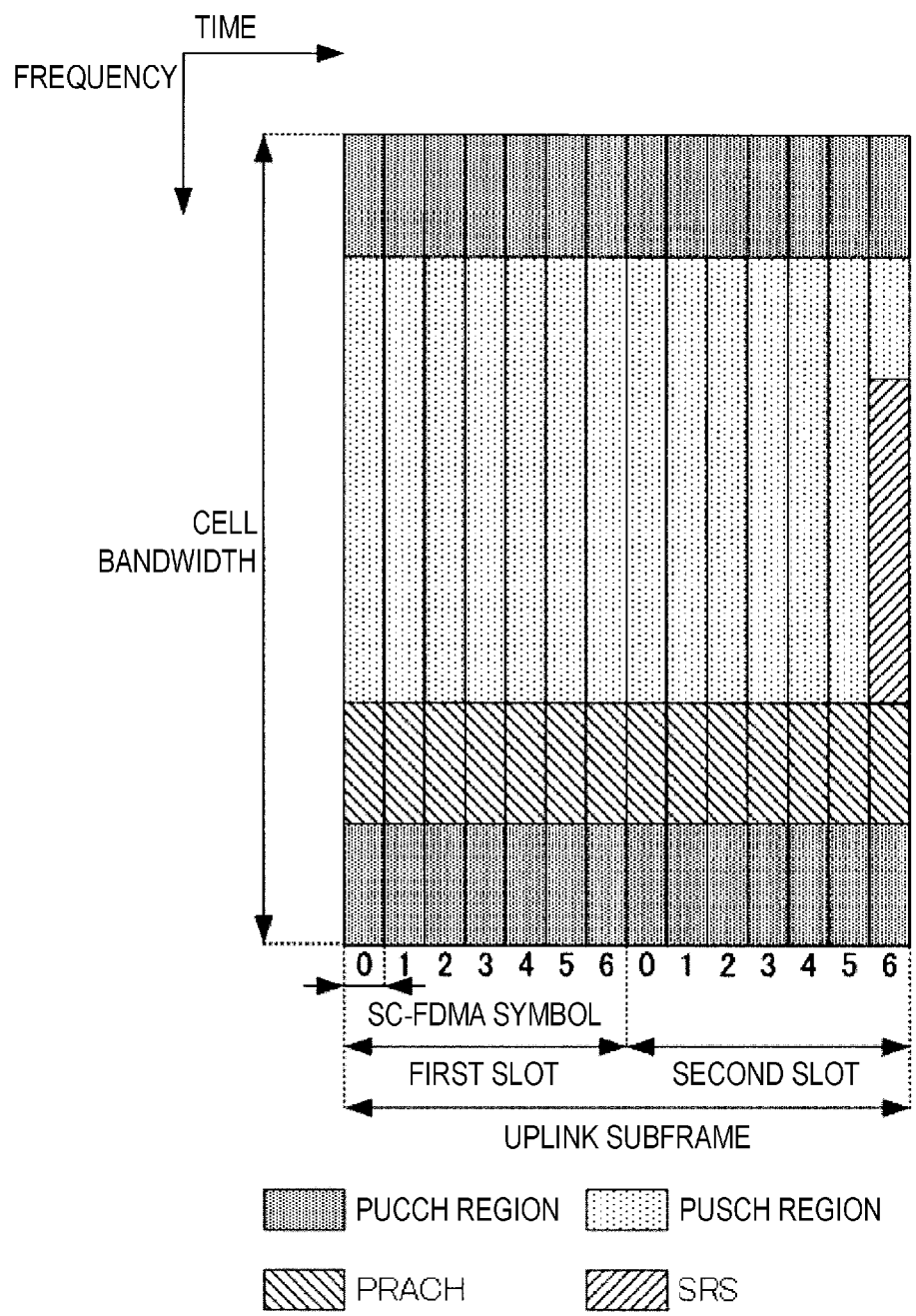
FIG. 5 is a diagram illustrating one example of allocation of a physical channel and mapping of a physical signal to an uplink subframe according to the present embodiment.

FIG. 5 is a diagram illustrating one example of the allocation of the physical channel and the mapping of the physical signal to the uplink subframe according to the present embodiment. In FIG. 5, the horizontal axis is a time axis, and the vertical axis is a frequency axis. In the uplink subframe, the mobile station device 1 may transmit the uplink physical channel (the PUCCH, the PUSCH or the PRACH) and the uplink physical signal (the DMRS or the SRS). In a PUCCH region, a plurality of PUCCHs are frequency-multiplexed, time-multiplexed, and code-multiplexed. In a PUSCH region, a plurality of PUSCHs are frequency-multiplexed and spatial-multiplexed. The PUCCH and the PUSCH may be frequency-multiplexed. The PRACH may be allocated over a single subframe or two subframes. Furthermore, a plurality of PRACHs may be code-multiplexed.

The SRS is transmitted using the last SC-FDMA symbol within the uplink subframe. To be more precise, the SRS is mapped to the last SC-FDMA symbol within the uplink subframe. The mobile station device 1 cannot transmit the SRS and the PUCCH/PUSCH/PRACH at the same time in a single SC-FDMA symbol in a single cell. In a single uplink subframe in a single cell, the mobile station device 1 can transmit the PUSCH and/or the PUCCH using the SC-FDMA symbol except for the last SC-FDMA symbol within the uplink subframe, and can transmit the SRS using the last SC-FDMA symbol within the uplink subframe. To be more precise, in the single uplink subframe in the single cell, the mobile station device 1 can transmit both of the SRS and the PUSCH/PUCCH at the same time. Moreover, the DMRS is time-multiplexed together with the PUCCH or the PUSCH. The DMRS is not illustrated in FIG. 5 for the sake of simplicity.

Figure 6:
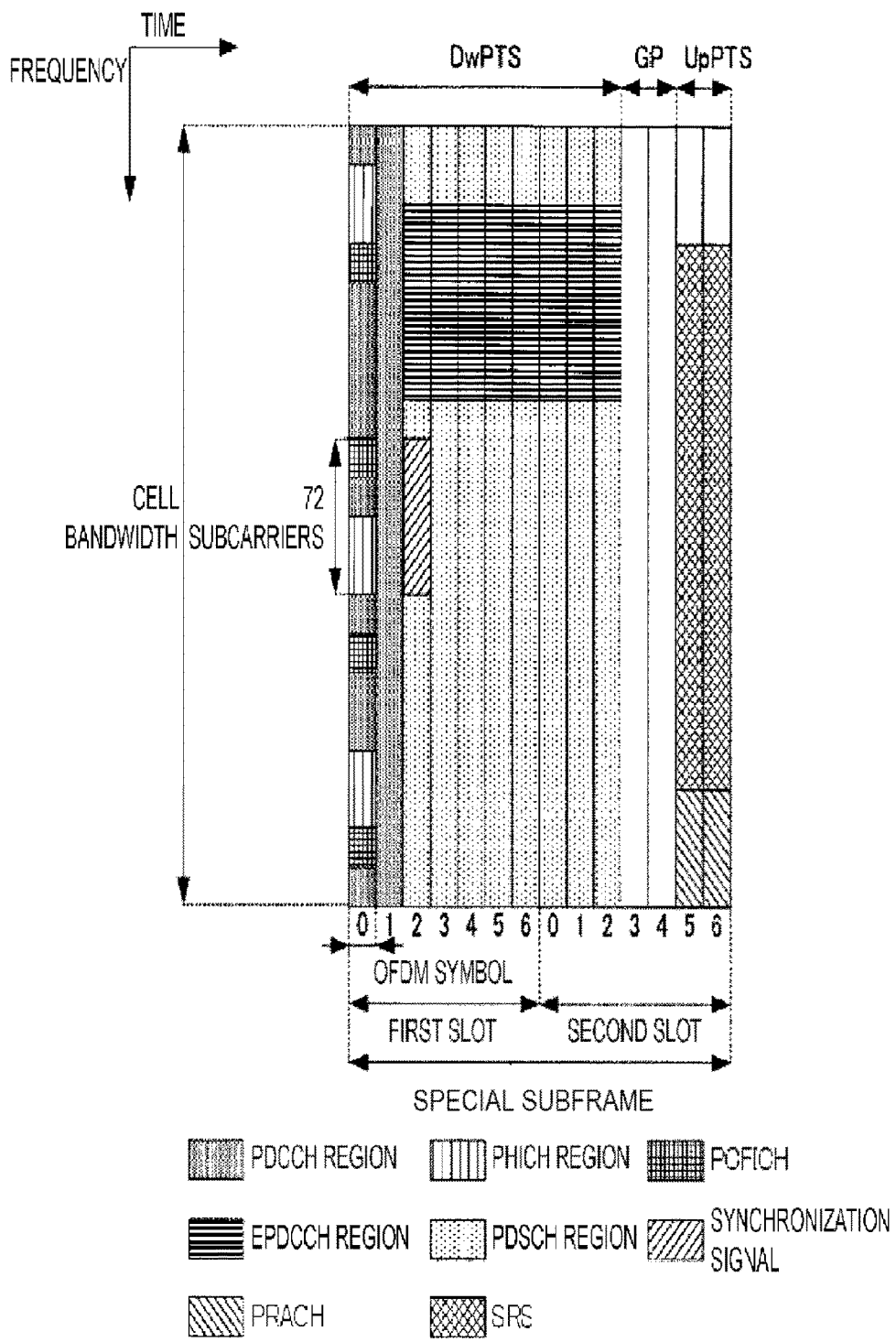
FIG. 6 is a diagram illustrating one example of allocation of a physical channel and mapping of a physical signal to a special subframe according to the present embodiment.

FIG. 6 is a diagram illustrating one example of the allocation of the physical channel and the mapping of the physical signal to the special subframe according to the present embodiment. In FIG. 6, the horizontal axis is a time axis, and the vertical axis is a frequency axis. In FIG. 6, the DwPTS is constituted of first to 10-th SC-FDMA symbols within the special subframe, the GP is constituted of 11-th and 12-th SC-FDMA symbols within the special subframe, and the UpPTS is constituted of 13-th and 14-th SC-FDMA symbols within the special subframe.

The base station device 3 may transmit the PCFICH, the PHICH, the PDCCH, the EPDCCH, the PDSCH, the synchronization signal, and the downlink reference signal, in the DwPTS of the special subframe. The base station device 3 does not transmit the PBCH in the DwPTS of the special subframe. The mobile station device 1 may transmit the PRACH and the SRS in the UpPTS of the special subframe. To be more precise, the mobile station device 1 transmits none of the PUCCH, the PUSCH, and the DMRS in the UpPTS of the special subframe.

Figure 7:
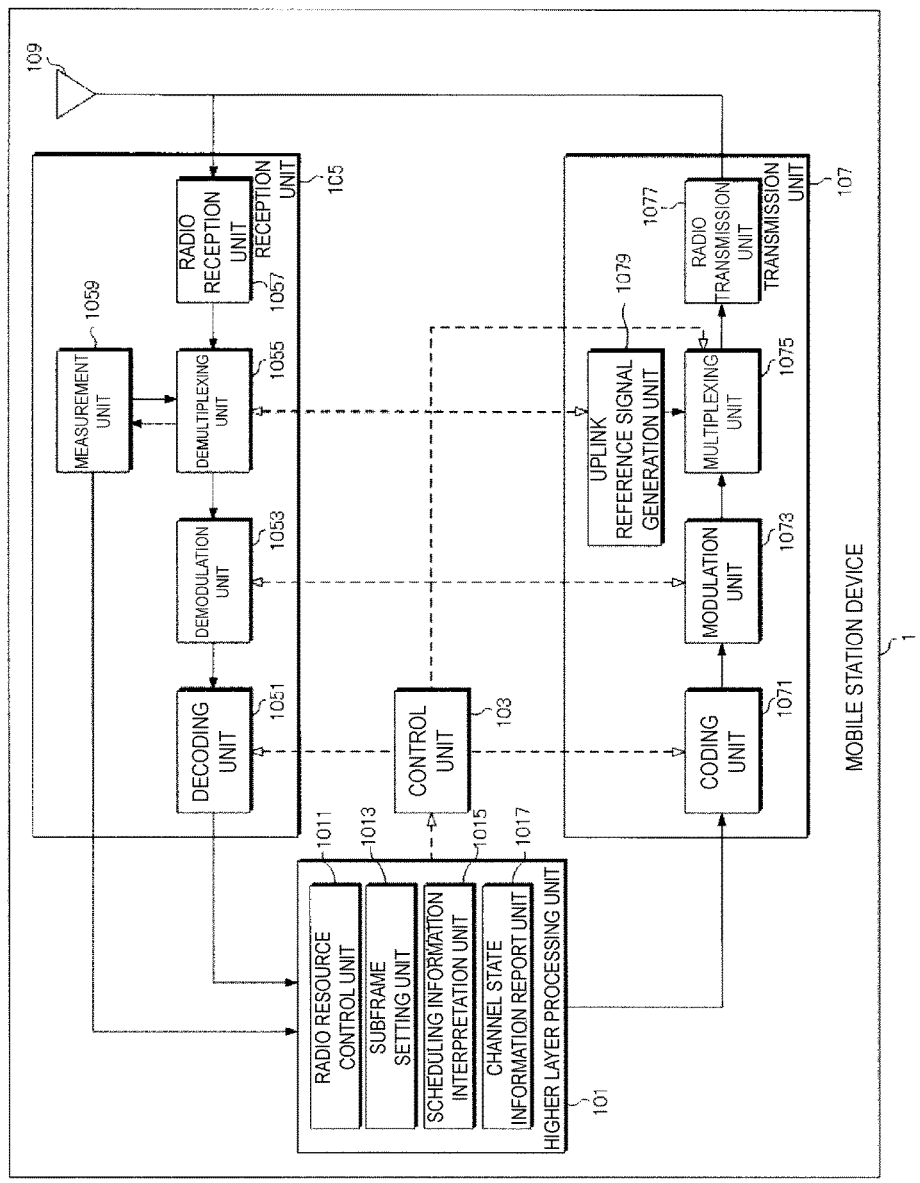
FIG. 7 is a schematic block diagram illustrating a configuration of a mobile station device 1 according to the present embodiment.

FIG. 7 is a schematic block diagram illustrating a configuration of the mobile station device 1 according to the present invention. As illustrated, the mobile station device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a subframe setting unit 1013, a scheduling information interpretation unit 1015, and a channel state information (CSI) report control unit 1017. Furthermore, the reception unit 105 is configured to include a decoding unit 1051, a demodulation unit 1053, a demultiplexing unit 1055, a radio reception unit 1057, and a measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. Furthermore, the higher layer processing unit 101 performs processing of the medium access control (MAC) layer, a packet data convergence protocol (PDCP) layer, a radio link control (RLC) layer, and a radio resource control (RRC) layer.

The radio resource control unit 1011 included in the higher layer processing unit 101 manages various pieces of configuration information of the mobile station device 1 itself. Furthermore, the radio resource control unit 1011 generates information arranged in each channel for uplink, and outputs the generated information to the transmission unit 107.

The subframe setting unit 1013 included in the higher layer processing unit 101 manages a first uplink reference UL-DL configuration, a first downlink reference UL-DL configuration, a second uplink reference UL-DL configuration, a second downlink reference UL-DL configuration, and a transmission direction UL-DL configuration (transmission direction configuration).

The subframe setting unit 1013 sets the first uplink reference UL-DL configuration, the first downlink reference UL-DL configuration, the second uplink reference UL-DL configuration, the second downlink reference UL-DL configuration, and the transmission direction UL-DL configuration. Furthermore, the subframe setting unit 1013 sets at least two subframe sets.

The scheduling information interpretation unit 1015 included in the higher layer processing unit 101 interprets the DCI format (scheduling information) received through the reception unit 105, generates control information for controlling of the reception unit 105 and the transmission unit 107, on the basis of a result of interpreting the DCI format, and outputs the generated control information to the control unit 103.

The scheduling information interpretation unit 1015 additionally determines timing at which transmission processing and reception processing are performed, on the basis of the first uplink reference UL-DL configuration, the first downlink reference UL-DL configuration, the second uplink reference UL-DL configuration, the second downlink reference UL-DL configuration, and/or the transmission direction UL-DL configuration.

A CSI report control unit 1017 specifies a CSI reference resource. The CSI report control unit 1017 instructs the measurement unit 1059 to derive a CQI relating to the CSI reference resource. The CSI report control unit 1017 instructs the transmission unit 107 to transmit the CQI. The CSI report control unit 1017 sets a configuration that is used when the measurement unit 1059 calculates the CQI.

On the basis of the control information originating from the higher layer processing unit 101, the control unit 103 generates a control signal for controlling of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the resulting information to the higher layer processing unit 101.

The radio reception unit 1057 converts (down-converts) a downlink signal received through the transmit and receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a guard interval (GI) from the digital signal resulting from the conversion, performs fast Fourier transform (FFT) on the signal from which the guard interval has been removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes a compensation of channels including the PHICH, the PDCCH, the EPDCCH, and the PDSCH, from a channel estimate input from the measurement unit 1059. Furthermore, the demultiplexing unit 1055 outputs the downlink reference signal resulting from the demultiplexing, to the measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the mobile station device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data on the basis of information on a coding rate notified with the downlink control information, and outputs, to the higher layer processing unit 101, the downlink data (the transport block) resulting from the decoding.

The measurement unit 1059 measures a downlink path loss or a channel state from the downlink reference signal input from the demultiplexing unit 1055, and outputs the measured path loss or channel state to the higher layer processing unit 101. Furthermore, the measurement unit 1059 calculates a downlink channel estimate from the downlink reference signal and outputs the calculated downlink channel estimate to the demultiplexing unit 1055. The measurement unit 1059 performs channel measurement and/or interference measurement in order to calculate the CQI.

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 codes the uplink control information input from the higher layer processing unit 101 in compliance with a coding scheme, such as convolutional coding or block coding. Furthermore, the coding unit 1071 performs turbo coding on the basis of information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. On the basis of the information used for the scheduling of the PUSCH, the modulation unit 1073 determines the number of data sequences to be spatial-multiplexed, maps a plurality of pieces of uplink data transmitted on the same PUSCH, to a plurality of sequences, through multiple input multiple output spatial multiplexing (MIMO SM), and performs precoding on the sequences.

The uplink reference signal generation unit 1079 generates a sequence acquired according to a rule (formula) prescribed in advance, on the basis of a physical cell identifier (also referred to as a physical cell identity (PCI), a CELL ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs discrete Fourier transform (DFT) on the rearranged modulation symbols. Furthermore, the multiplexing unit 1075 multiplexes PUCCH and PUSCH signals and the generated uplink reference signal for each transmit antenna port. To be more precise, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, performs modulation in compliance with an SC-FDMA scheme, attaches the guard interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

Figure 8:
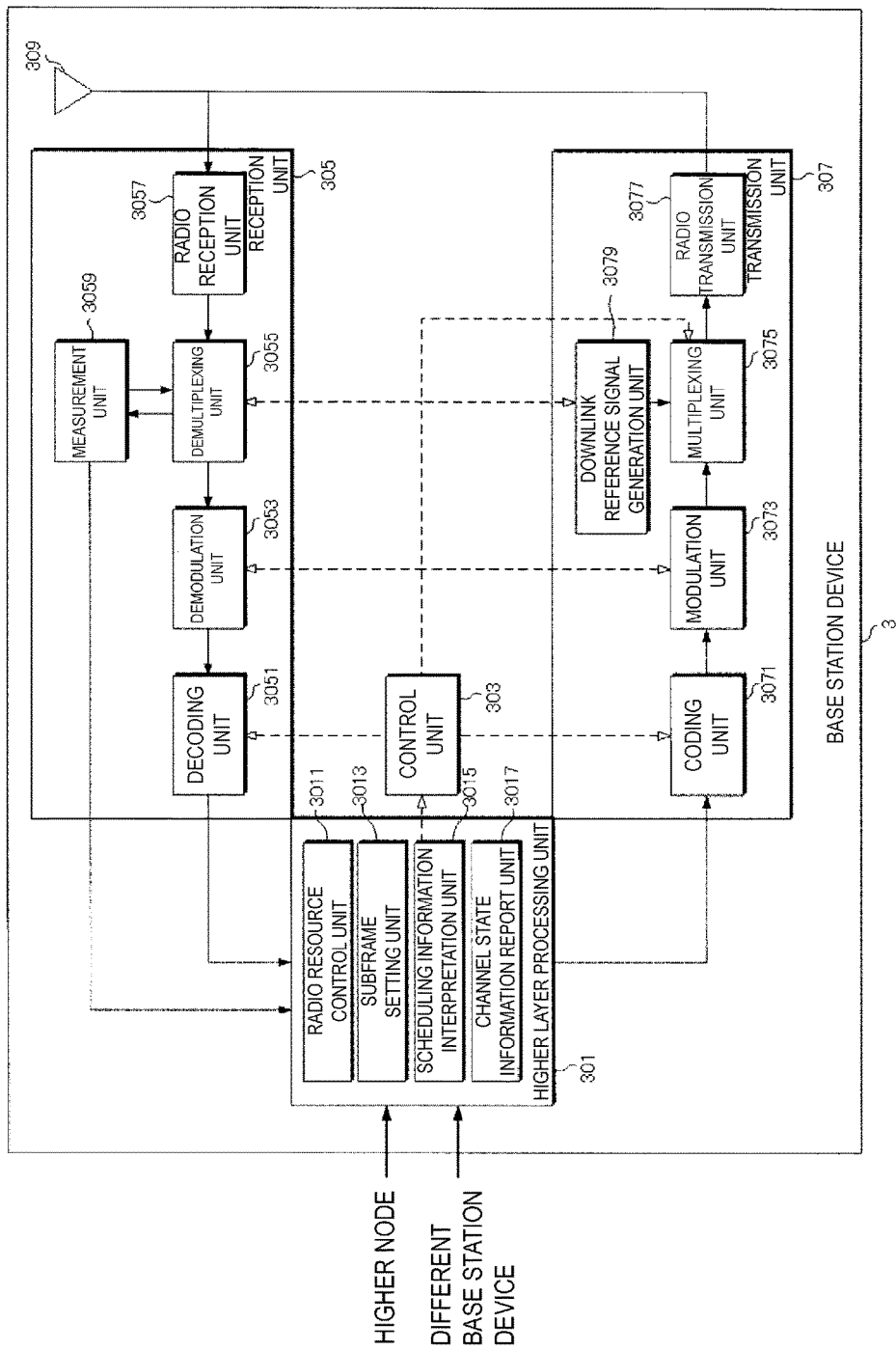
FIG. 8 is a schematic block diagram illustrating a configuration of a base station device 3 according to the present embodiment.

FIG. 8 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a subframe setting unit 3013, a scheduling unit 3015, and a CSI report control unit 3017. Furthermore, the reception unit 305 is configured to include a decoding unit 3051, a demodulation unit 3053, a demultiplexing unit 3055, a radio reception unit 3057, and a measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for controlling the reception unit 305 and the transmission unit 307, and outputs the generated control information to the control unit 303.

The radio resource control unit 3011 included in the higher layer processing unit 301 generates, or acquires from a higher node, the downlink data (the transport block) arranged in the downlink PDSCH, system information, the RRC message, the MAC control element (CE), and the like, and outputs a result of the generation or the acquirement to the transmission unit 307. Furthermore, the radio resource control unit 3011 manages various pieces of configuration information on each of the mobile station devices 1.

The subframe setting unit 3013 included in the higher layer processing unit 301 performs management of the first uplink reference UL-DL configuration, the first downlink reference UL-DL configuration, the second uplink reference UL-DL configuration, the second downlink reference UL-DL configuration, and the transmission direction UL-DL configuration, on each of the mobile station devices 1.

The subframe setting unit 3013 sets the first uplink reference UL-DL configuration, the first downlink reference UL-DL configuration, the second uplink reference UL-DL configuration, the second downlink reference UL-DL configuration, and the transmission direction UL-DL configuration, for each of the mobile station devices 1.

The subframe setting unit 3013 generates first information indicating the first uplink reference UL-DL configuration, second information indicating the first downlink reference UL-DL configuration, and third information indicating the transmission direction UL-DL configuration. The subframe setting unit 3013 outputs the first information, the second information, and the third information to the mobile station device 1 through the transmission unit 307.

The base station device 3 may determine the first uplink reference UL-DL configuration, the first downlink reference UL-DL configuration, the second uplink reference UL-DL configuration, the second downlink reference UL-DL configuration, and/or the transmission direction UL-DL configuration, for the mobile station device 1. Furthermore, the base station device 3 may be instructed by the higher node to set the first uplink reference UL-DL configuration, the first downlink reference UL-DL configuration, the second uplink reference UL-DL configuration, the second downlink reference UL-DL configuration, and/or the transmission direction UL-DL configuration, for the mobile station device 1.

For example, on the basis of the amount of uplink traffic and the amount of downlink traffic, the subframe setting unit 3013 may determine the first uplink reference UL-DL configuration, the first downlink reference UL-DL configuration, the second uplink reference UL-DL configuration, the second downlink reference UL-DL configuration, and/or the transmission direction UL-DL configuration.

The subframe setting unit 3013 performs management of at least two subframe sets. The subframe setting unit 3013 may set at least two subframe sets for each of the mobile station devices 1. The subframe setting unit 3013 may set at least two subframe sets for each of the serving cells. The subframe setting unit 3013 may set at least two subframe sets for each CSI process.

The subframe setting unit 3013 transmits information indicating at least two subframe sets to the mobile station device 1 through the transmission unit 307.

The scheduling unit 3015 included in the higher layer processing unit 301 determines a frequency and a subframe to which the physical channel (the PDSCH and the PUSCH) is allocated, the coding rate and modulation scheme for the physical channel (the PDSCH and the PUSCH), the transmission power, and the like, from the received channel state information and from the channel estimate, channel quality, or the like input from the measurement unit 3059. The scheduling unit 3015 determines whether, in a flexible subframe, the downlink physical channel and/or the downlink physical signal is scheduled or the uplink physical channel and/or the uplink physical signal is scheduled. The scheduling unit 3015 generates the control information (for example, the DCI format) in order to control the reception unit 305 and the transmission unit 307 on the basis of a result of the scheduling, and outputs the generated information to the control unit 303.

The scheduling unit 3015 generates the information to be used for the scheduling of the physical channel (the PDSCH and the PUSCH), on the basis of the result of the scheduling. The scheduling unit 3015 additionally determines the timing at which the transmission processing and the reception processing are performed, on the basis of the first uplink reference UL-DL configuration, the first downlink reference UL-DL configuration, the second uplink reference UL-DL configuration, the second downlink reference UL-DL configuration, and/or the transmission direction UL-DL configuration.

The CSI report control unit 3017 included in the higher layer processing unit 301 controls a CSI report that is made by the mobile station device 1. The CSI report control unit 3017 transmits information that is assumed in order for the mobile station device 1 to derive a CQI in the CSI reference resource and that shows various configurations, to the mobile station device 1 through the transmission unit 307.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the mobile station device 1 through the transmit and receive antenna 309, and outputs the decoded information to the higher layer processing unit 301. The radio reception unit 3057 converts (down-converts) an uplink signal received through the transmit and receive antenna 309 into a signal of an intermediate frequency, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal.

The radio reception unit 3057 removes a portion corresponding to the guard interval (GI) from the digital signal resulting from the conversion. The radio reception unit 3057 performs fast Fourier transform (FFT) on the signal from which the guard interval has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. Moreover, the demultiplexing is performed on the basis of radio resource allocation information that is determined in advance by the base station device 3 using the radio resource control unit 3011 and that is included in the uplink grant notified to each of the mobile station devices 1. Furthermore, the demultiplexing unit 3055 makes a compensation of channels including the PUCCH and the PUSCH from the channel estimate input from the measurement unit 3059. Furthermore, the demultiplexing unit 3055 outputs an uplink reference signal resulting from the demultiplexing, to the measurement unit 3059.

The demodulation unit 3053 performs inverse discrete Fourier transform (IDFT) on the PUSCH, acquires the modulation symbol, and performs reception signal demodulation on each of the modulation symbols of the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 itself notifies, in advance with the uplink grant, to each of the mobile station devices 1. The demodulation unit 3053 demultiplexes the modulation symbols of the plurality of pieces of uplink data transmitted on the same PUSCH by using the MIMO SM, on the basis of the number of spatial-multiplexed sequences notified in advance with the uplink grant to each of the mobile station devices 1 and information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the mobile station device 1 by the base station device 3 itself, and outputs, to the higher layer processing unit 101, the decoded uplink data and uplink control information. In a case where the PUSCH is re-transmitted, the decoding unit 3051 performs the decoding using the coded bits input from the higher layer processing unit 301 and retained in an HARQ buffer, and the demodulated coded bits. The measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the mobile station device 1 through the transmit and receive antenna 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the mobile station device 1 and that is acquired according to a rule prescribed in advance on the basis of the physical cell identifier (PCI) for identifying the base station device 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal to the resource elements.

The radio transmission unit 3077 performs inverse fast Fourier transform (IFFT) on the modulation symbol resulting from the multiplexing, performs the modulation in compliance with an OFDM scheme to generate an OFDM symbol, attaches the guard interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and receive antenna 309 for transmission.

The first uplink reference UL-DL configuration (uplink reference uplink-downlink configuration), the first downlink reference UL-DL configuration (downlink reference uplink-downlink configuration), the second uplink reference UL-DL configuration, the second downlink reference UL-DL configuration, and the transmission direction UL-DL configuration (transmission direction uplink-downlink configuration) will be described below.

The first uplink reference UL-DL configuration, the first downlink reference UL-DL configuration, the second uplink reference UL-DL configuration, the second downlink reference UL-DL configuration, and the transmission direction UL-DL configuration are defined by an uplink-downlink configuration (UL-DL configuration).

The uplink-downlink configuration is a configuration relating to the pattern of a subframe within the radio frame. The uplink-downlink configuration indicates which subframe among the downlink subframe, the uplink subframe, and the special subframe, each of the subframes within the radio frame corresponds to.

To be more precise, the first uplink reference UL-DL configuration, the second uplink reference UL-DL configuration, the first downlink reference UL-DL configuration, the second downlink reference UL-DL configuration, and the transmission direction UL-DL configuration are defined by the patterns of the downlink subframe, the uplink subframe, and the special subframe within the radio frame.

The pattern of the downlink subframe, the uplink subframe, and the special subframe indicates which subframe among the downlink subframe, the uplink subframe, and the special subframe, each of subframes #0 to #9 corresponds to, and is desirably expressed by any combinations of D, U, and S (which denote the downlink subframe, the uplink subframe, and the special subframe, respectively) in a length of D, U, and S being 10. More desirably, the first subframe (to be more precise, subframe #0) is D, and the second subframe is S (to be more precise, subframe #1).

FIG. 9 illustrates one example of the uplink-downlink configuration according to the present embodiment. In FIG. 9, D denotes a downlink subframe, U denotes an uplink subframe, and S denotes a special subframe.

In FIG. 9, subframe 1 within the radio frame is always a special subframe. In FIG. 9, subframes 0 and 5 are always reserved for the downlink transmission, and subframe 2 is always reserved for the uplink transmission.

In FIG. 9, in a case where a downlink-uplink switch-point periodicity is 5 ms, subframe 6 within the radio frame is a special subframe. In a case where the downlink-uplink switch-point periodicity is 10 ms, subframe 6 within the radio frame is a downlink subframe.

The first uplink reference UL-DL configuration is also referred to as a first parameter, a first configuration or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

Setting of uplink-downlink configuration i as the first or second uplink reference UL-DL configuration is referred to as setting of first or second uplink reference UL-DL configuration i. Setting of uplink-downlink configuration i as the first or second downlink reference UL-DL configuration is referred to as setting of first or second downlink reference UL-DL configuration i. Setting of uplink-downlink configuration i as the transmission direction UL-DL configuration is referred to as setting of transmission direction UL-DL configuration i.

A method of setting the first uplink reference UL-DL configuration, the first downlink reference UL-DL configuration, and the transmission direction UL-DL configuration will be described below.

The base station device 3 sets the first uplink reference UL-DL configuration, the first downlink reference UL-DL configuration, and the transmission direction UL-DL configuration. The base station device 3 transmits the first information (TDD-Config) indicating the first uplink reference UL-DL configuration, the second information indicating the first downlink reference UL-DL configuration, and the third information indicating the transmission direction UL-DL configuration, with the first information, the second information, and the third information included in at least one of an MIB, a system information block type 1 message, a system information message, an RRC message, a MAC control element (CE), and physical layer control information (for example, a DCI format). Furthermore, the base station device 3 may include the first information, the second information, and the third information in any one of the MIB, the system information block type 1 message, the system information message, the RRC message, the MAC control element (CE), and the physical layer control information (for example, the DCI format), depending on a situation.

For each of the serving cells, the first uplink reference UL-DL configuration, the second uplink reference UL-DL configuration, the first downlink reference UL-DL configuration, the second downlink reference UL-DL configuration, and the transmission direction UL-DL configuration may be defined.

The base station device 3 transmits, to the mobile station device 1 for which a plurality of serving cells are set, the first information, the second information, and the third information for each of the serving cells. Moreover, for each of the serving cells, the first information, the second information, and the third information may be defined.

The base station device 3 may transmit the first information for the primary cell, the second information for the primary cell, the third information for the primary cell, the first information for the secondary cell, the second information for the secondary cell, and the third information for the secondary cell, to the mobile station device 1 for which two serving cells including one primary cell and one secondary cell are set.

The mobile station device 1 for which a plurality of serving cells are set may set the first uplink reference UL-DL configuration, the first downlink reference UL-DL configuration, and the transmission direction DL-UL configuration for each of the serving cells, on the basis of the first information, the second information, and the third information.

The mobile station device 1 for which the two serving cells including one primary cell and one secondary cell are set, may set the first uplink reference UL-DL configuration for the primary cell, the first downlink reference UL-DL configuration for the primary cell, the transmission direction DL-UL configuration for the primary cell, the first uplink reference UL-DL configuration for the secondary cell, the first downlink reference UL-DL configuration for the secondary cell, and the transmission direction UL-DL configuration for the secondary cell.

The first information for the primary cell is desirably included in the system information block type 1 message or the RRC message. The first information for the secondary cell is desirably included in the RRC message. The second information for the primary cell is desirably included in the system information block type 1 message, the system information message, or the RRC message. The second information for the secondary cell is desirably included in the RRC message. The third information is desirably included in the physical layer control information (for example, the DCI format).

The first information is desirably common to a plurality of the mobile station devices 1 within a cell. The second information may be common to the plurality of mobile station devices 1 within the cell or may be dedicated to each of the mobile station devices 1. The third information may be common to the plurality of mobile station devices 1 within the cell or may be dedicated to each of the mobile station devices 1.

The system information block type 1 message is initially transmitted on PDSCH in subframe 5 within a radio frame satisfying SFN mod 8=0, and is re-transmitted (repetition) in subframe 5 within a different radio frame satisfying SFN mod 2=0. The system information block type 1 message includes information indicating a configuration (the lengths of the DwPTS, the GP, and the UpPTS) of a special subframe. The system information block type 1 message is cell-specific information.

The system information message is transmitted on the PDSCH. The system information message is cell-specific information. The system information message includes a system information block X other than the system information block type 1.

The RRC message is transmitted on the PDSCH. The RRC message is information or a signal that is processed in an RRC layer. The RRC message may be common to the plurality of mobile station devices 1 within a cell or may be dedicated to a specific mobile station device 1.

The MAC CE is transmitted on the PDSCH. The MAC CE is information or a signal that is processed in a MAC layer.

In a case where the physical layer control information (for example, the DCI format) including the first information, the second information, and/or the third information is received on the downlink physical channel (for example, the PDCCH/EPDCCH) in subframe n−k, the mobile station device 1 desirably sets (enables) the first uplink reference UL-DL configuration, the first downlink reference UL-DL configuration, and/or the transmission direction UL-DL configuration in subframe n. For example, k is 4 or 8. For example, subframe n+k is a subframe to be used to transmit the HARQ-ACK (ACK) for the downlink physical channel (for example, the PDCCH/EPDCCH) used to transmit the physical layer control information (for example, the DCI format). For example, k is determined on the basis of the table in FIG. 21 and the current first or second downlink reference UL-DL configuration.

In a case where the physical layer control information (for example, the DCI format) including the third information is received on the downlink physical channel (for example, the PDCCH/EPDCCH) in the radio frame n−k, the mobile station device 1 desirably sets (enables) the transmission direction UL-DL configuration in the radio frame n. For example, k is one. The third information received in the radio frame n−k may be valid only for the radio frame n.

Figure 10:
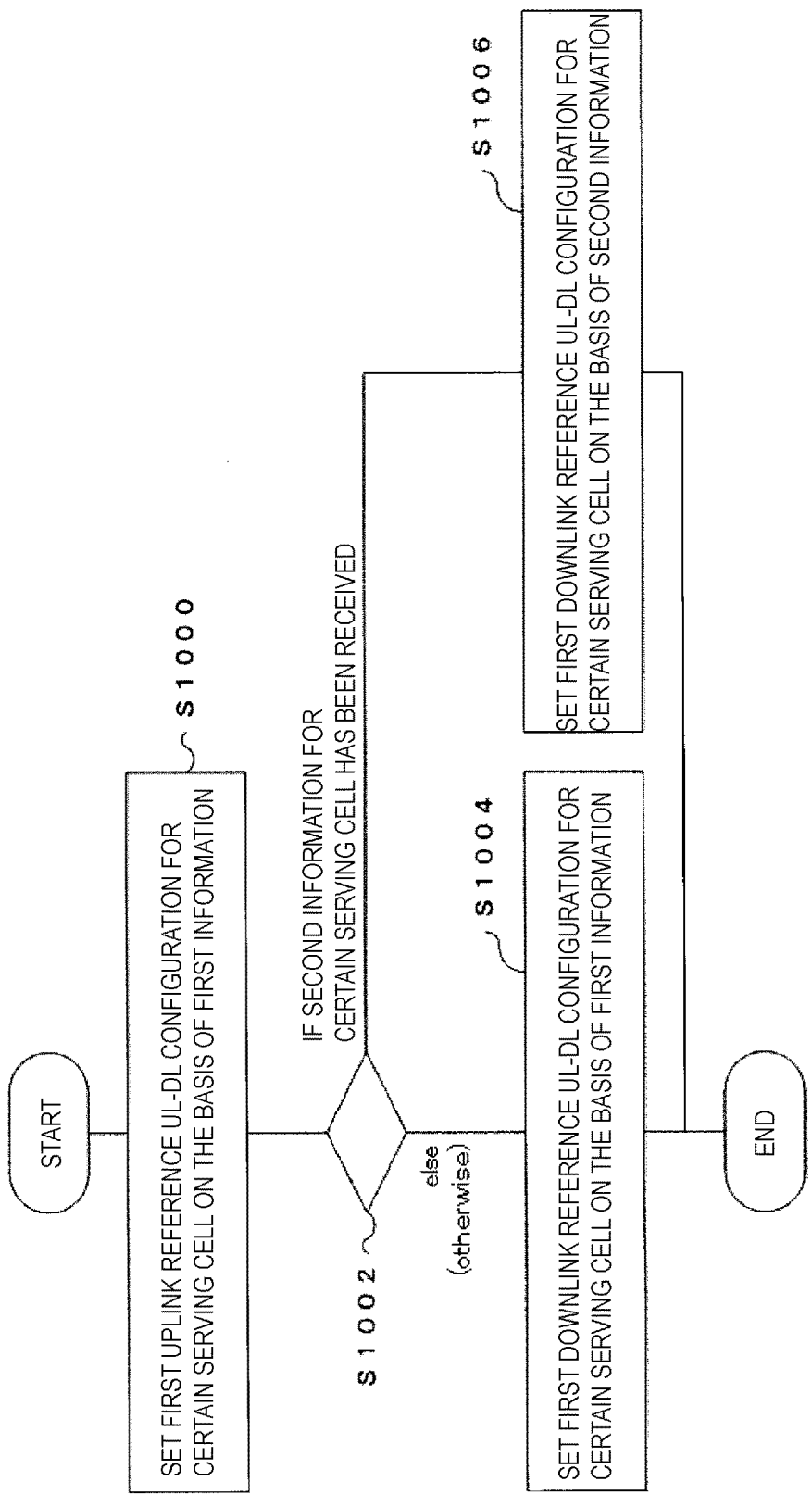
FIG. 10 is a flowchart illustrating a method of setting a first uplink reference UL-DL configuration and a first downlink reference UL-DL configuration according to the present embodiment.

FIG. 10 is a flowchart illustrating a method of setting the first uplink reference UL-DL configuration and the first downlink reference UL-DL configuration according to the present embodiment. The mobile station device 1 performs the setting method illustrated in FIG. 10 on each of the serving cells.

The mobile station device 1 sets the first uplink reference UL-DL configuration for a certain serving cell on the basis of the first information (S1000). The mobile station device 1 determines whether or not the second information for the certain serving cell has been received (S1002). In a case where the second information for the certain serving cell has been received, the mobile station device 1 sets the first downlink reference UL-DL configuration for the certain serving cell on the basis of the second information for the certain serving cell (S1006). In a case where the second information for the certain serving cell has not been received (else or otherwise), the mobile station device 1 sets the first downlink reference UL-DL configuration for the certain serving cell on the basis of the first information for the certain serving cell (S1004).

The serving cell for which the first uplink reference UL-DL configuration and the first downlink reference UL-DL configuration are set on the basis of the first information, is also referred to as a serving cell for which dynamic TDD is not set. The serving cell for which the first downlink reference UL-DL configuration is set on the basis of the second information, is also referred to as a serving cell for which the dynamic TDD is set.

The mobile station device 1 receives the second information and determines, on the basis of the second information, a subframe available for the transmission of an uplink signal. Next, the mobile station device 1 monitors the third information. In a case where the third information has been received, the mobile station device 1 determines a subframe available for the transmission of the uplink signal, on the basis of the third information.

For example, the base station device 3 transmits the third information to the mobile station device 1 on the PDCCH/EPDCCH. The third information is for control of the dynamic TDD operation within a coverage of the base station device 3 (cell). The third information is transmitted and received in a common search space (CSS) or a UE-specific search space (USS).

The CSS is a region in which the plurality of mobile station devices 1 monitor the PDCCH/EPDCCH in common. The USS is a region defined on the basis of at least the C-RNTI. The C-RNTI is an identifier uniquely allocated to the mobile station device 1.

The C-RNTI may be used for transmission of the DCI format including the third information (information indicating a transmission direction for a subframe). RNTI that is different from the C-RNTI and the SPS C-RNTI may be used for transmission of the DCI format including the third information (information indicating the transmission direction for the subframe). The RNTI is referred to as an X-RNTI. To be more precise, the CRC parity bits attached to the DCI format including the third information are scrambled with the C-RNTI or the X-RNTI.

Furthermore, a subframe used by the mobile station device 1 to monitor the PDCCH/EPDCCH including the third information may be limited. The base station device 3 may control a subframe used by the mobile station device 1 to monitor the PDCCH/EPDCCH including the third information. The base station device 3 may transmit information indicating the subframe used by the mobile station device 1 to monitor the PDCCH/EPDCCH including the third information, to the mobile station device 1.

For example, the PDCCH/EPDCCH including the third information may be allocated at intervals of 10 subframes. For example, the mobile station device 1 monitors the third information at intervals of 10 subframes. The subframe to which the PDCCH/EPDCCH including the third information can be allocated may be determined in advance. For example, the third information may be arranged only in subframe 0 or 5 within the radio frame.

The mobile station device 1 that has started the dynamic TDD operation monitors the PDCCH/EPDCCH including the third information, in each subframe to which the PDCCH/EPDCCH including the third information can be allocated.

The mobile station device 1 attempts to decode a received signal and determines whether or not the PDCCH/EPDCCH including the third information is detected. In a case where the PDCCH/EPDCCH including the third information has been detected, the mobile station device 1 determines a subframe available for the transmission of the uplink signal, on the basis of the detected third information. In a case where the PDCCH/EPDCCH including the third information has not been detected, the mobile station device 1 may maintain the determination made so far of the subframe available for the transmission of the uplink signal.

A method of setting the second uplink reference UL-DL configuration will be described below.

In a case where a plurality of serving cells are set for the mobile station device 1 and the first uplink reference UL-DL configurations for at least two serving cells are different from each other, the mobile station device 1 and the base station device 3 set the second uplink reference UL-DL configuration.

Except for the case where the plurality of serving cells are set for the mobile station device 1 and the first uplink reference UL-DL configurations for at least two serving cells are different from each other, the mobile station device 1 and the base station device 3 need not set the second uplink reference UL-DL configuration.

Except for the case where the first uplink reference UL-DL configurations for at least two serving cells are different from each other, the first uplink reference UL-DL configurations for all the serving cells are the same. In a case where one serving cell is set for the mobile station device 1, the mobile station device 1 and the base station device 3 need not set the second uplink reference UL-DL configuration.

Figure 11:
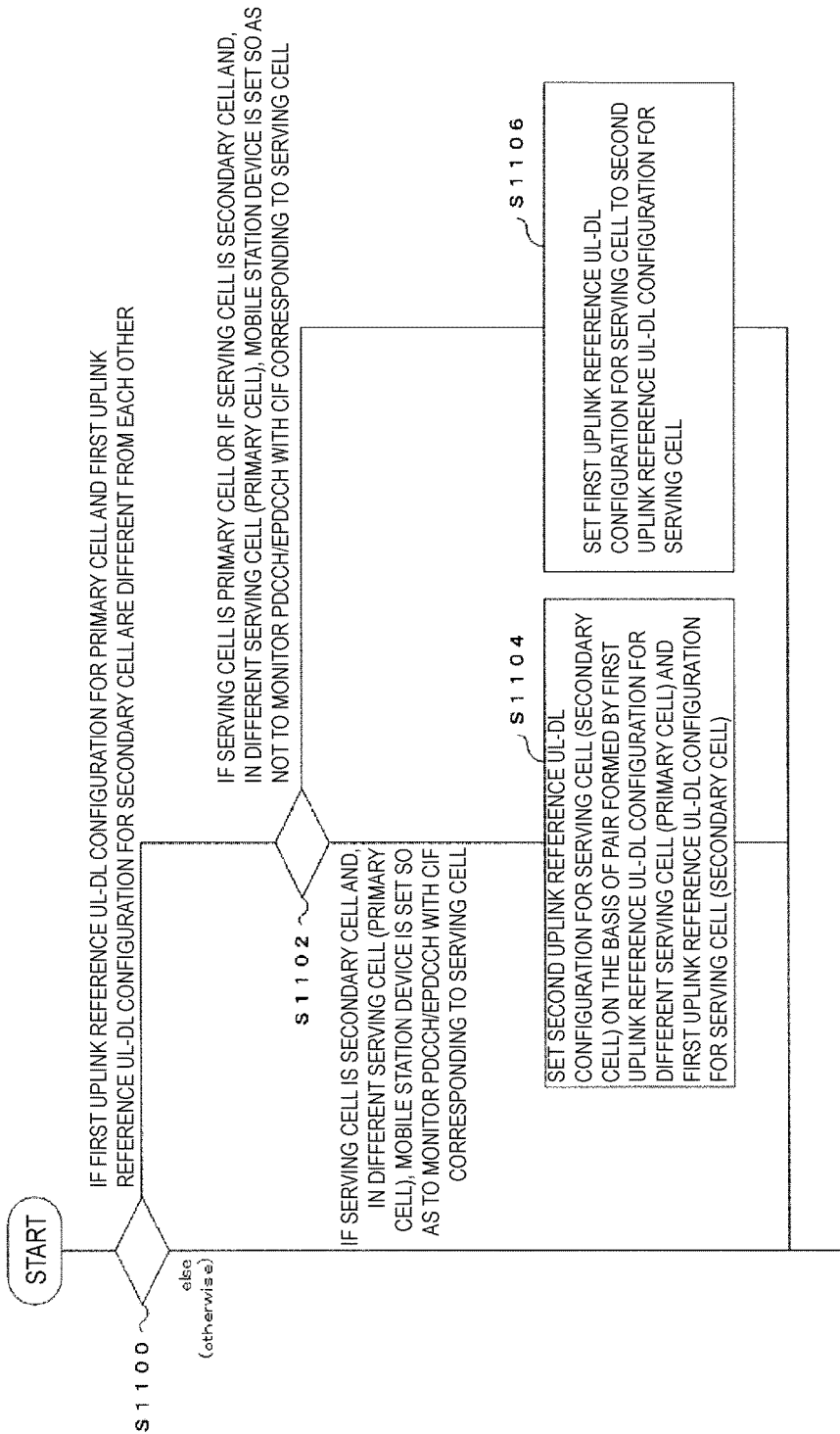
FIG. 11 is a flowchart illustrating a method of setting a second uplink reference UL-DL configuration according to the present embodiment.

FIG. 11 is a flowchart illustrating a method of setting the second uplink reference UL-DL configuration according to the present embodiment. In FIG. 11, one primary cell and one secondary cell are set for the mobile station device 1. The mobile station device 1 performs the setting method illustrated in FIG. 11 for each of the primary cell and the secondary cell.

The mobile station device 1 determines whether or not the first uplink reference UL-DL configuration for the primary cell and the first uplink reference UL-DL configuration for the secondary cell are different from each other (S1100). In a case where the first uplink reference UL-DL configuration for the primary cell and the first uplink reference UL-DL configuration for the secondary cell are the same, the mobile station device 1 terminates the process of setting the second uplink reference UL-DL configuration, without setting the second uplink reference UL-DL configuration.

In a case where the first uplink reference UL-DL configuration for the primary cell and the first uplink reference UL-DL configuration for the secondary cell are different from each other, the mobile station device 1 determines whether the serving cell is a primary cell or a secondary cell, and/or whether or not a different serving cell is set so as to monitor the PDCCH/EPDCCH with a carrier indicator field (CIF) corresponding to the serving cell (S1102).

In a case where the serving cell is a secondary cell and the mobile station device 1 is set so as to monitor the PDCCH/EPDCCH with the CIF corresponding to the serving cell (the secondary cell), in the different cell (the primary cell), the mobile station device 1 sets the second uplink reference UL-DL configuration for the serving cell (the secondary cell), on the basis of a pair formed by the first uplink reference UL-DL configuration for the different serving cell (the primary cell) and the first uplink reference UL-DL configuration for the serving cell (the serving cell) (S1104).

In S1104, the mobile station device 1 sets the second uplink reference UL-DL configuration for the serving cell (the secondary cell) on the basis of the table in FIG. 12. FIG. 12 is a diagram illustrating a correspondence between a pair formed by the first uplink reference UL-DL configuration for the different serving cell (the primary cell) and the first uplink reference UL-DL configuration for the serving cell (the secondary cell), and the second uplink reference UL-DL configuration for the secondary cell, according to the present embodiment.

In FIG. 12, a primary cell UL-DL configuration refers to the first uplink reference UL-DL configuration for the different serving cell (the primary cell). In FIG. 12, a secondary cell UL-DL configuration refers to the first uplink reference UL-DL configuration for the serving cell (the secondary cell).

For example, in a case where a first uplink reference UL-DL configuration 0 is set for the different serving cell (the primary cell) and a first uplink reference UL-DL configuration 2 is set for the serving cell (the secondary cell), a second uplink reference UL-DL configuration 1 is set for the secondary cell.

In a case where the serving cell is a primary cell or a secondary cell and the mobile station device 1 is set so as not to monitor the PDCCH/EPDCCH with the CIF corresponding to the serving cell (the secondary cell) in the different serving cell (the primary cell), the mobile station device 1 sets the first uplink reference UL-DL configuration for the serving cell to the second uplink reference UL-DL configuration for the serving cell (S1106).

The base station device 3 sets the second uplink reference UL-DL configuration on the basis of the setting method illustrated in FIG. 11.

The monitoring of the PDCCH/EPDCCH with the CIF means attempting to decode the PDCCH or the EPDCCH according to the DCI format including the CIF. The CIF is a field to which a carrier indicator is mapped. The value of the carrier indicator indicates a serving cell to which the DCI format corresponds, the carrier indicator relating to the DCI format.

The mobile station device 1 that is set so as to monitor the PDCCH/EPDCCH with the CIF corresponding to the serving cell in the different serving cell monitors the PDCCH/EPDCCH with the CIF in the different serving cell.

The mobile station device 1 that is set so as to monitor the PDCCH/EPDCCH with the CIF corresponding to the serving cell in the different serving cell desirably receives the third information for the serving cell on the PDCCH/EPDCCH in the different serving cell.

The mobile station device 1 that is not set so as to monitor the PDCCH/EPDCCH with the CIF corresponding to the serving cell in the different serving cell monitors the PDCCH/EPDCCH with the CIF or without the CIF, in the serving cell.

The mobile station device 1 that is not set so as to monitor the PDCCH/EPDCCH with the CIF corresponding to the serving cell in the different serving cell desirably receives the third information for the serving cell on the PDCCH/EPDCCH in the serving cell.

The PDCCH/EPDCCH for the primary cell is transmitted in the primary cell. The third information for the primary cell is desirably transmitted on the PDCCH/EPDCCH in the primary cell.

The base station device 3 transmits, to the mobile station device 1, a parameter (cif-Presence-r10) indicating whether or not the CIF is included in the DCI format transmitted in the primary cell.

For each secondary cell, the base station device 3 transmits, to the mobile station device 1, a parameter (CrossCarrierSchedulingConfig-r10) relating to cross carrier scheduling.

The parameter (CrossCarrierSchedulingConfig-r10) includes a parameter (schedulingCellInfo-r10) indicating whether or not the PDCCH/EPDCCH corresponding to a related secondary cell is transmitted in the secondary cell or is transmitted in the different serving cell.

In a case where the parameter (schedulingCellInfo-r10) indicates that the PDCCH/EPDCCH corresponding to a related secondary cell is transmitted in the secondary cell, the parameter (schedulingCellInfo-r10) includes a parameter (cif-Presence-r10) indicating whether or not the CIF is included in the DCI format transmitted in the secondary cell.

In a case where the parameter (schedulingCellInfo-r10) indicates that the PDCCH/EPDCCH corresponding to a related secondary cell is transmitted in a different serving cell, the parameter (schedulingCellInfo-r10) includes a parameter (schedulingCellId) indicating the serving cell in which the downlink allocation for the related secondary cell is sent.

A method of setting the second downlink reference UL-DL configuration will be described below.

In a case where a plurality of serving cells are set for the mobile station device 1 and the first downlink reference UL-DL configurations for at least two serving cells are different from each other, the mobile station device 1 and the base station device 3 set the second downlink reference UL-DL configuration. Except for the case where the plurality of serving cells are set for the mobile station device 1 and the first downlink reference UL-DL configurations for at least two serving cells are different from each other, the mobile station device 1 and the base station device 3 need not set the second downlink reference UL-DL configuration.

Except for the case where the first downlink reference UL-DL configurations for at least two serving cells are different from each other, the first downlink reference UL-DL configurations for all the serving cells are the same. In a case where one serving cell is set for the mobile station device 1, the mobile station device 1 and the base station device 3 need not set the second downlink reference UL-DL configuration.

Figure 13:
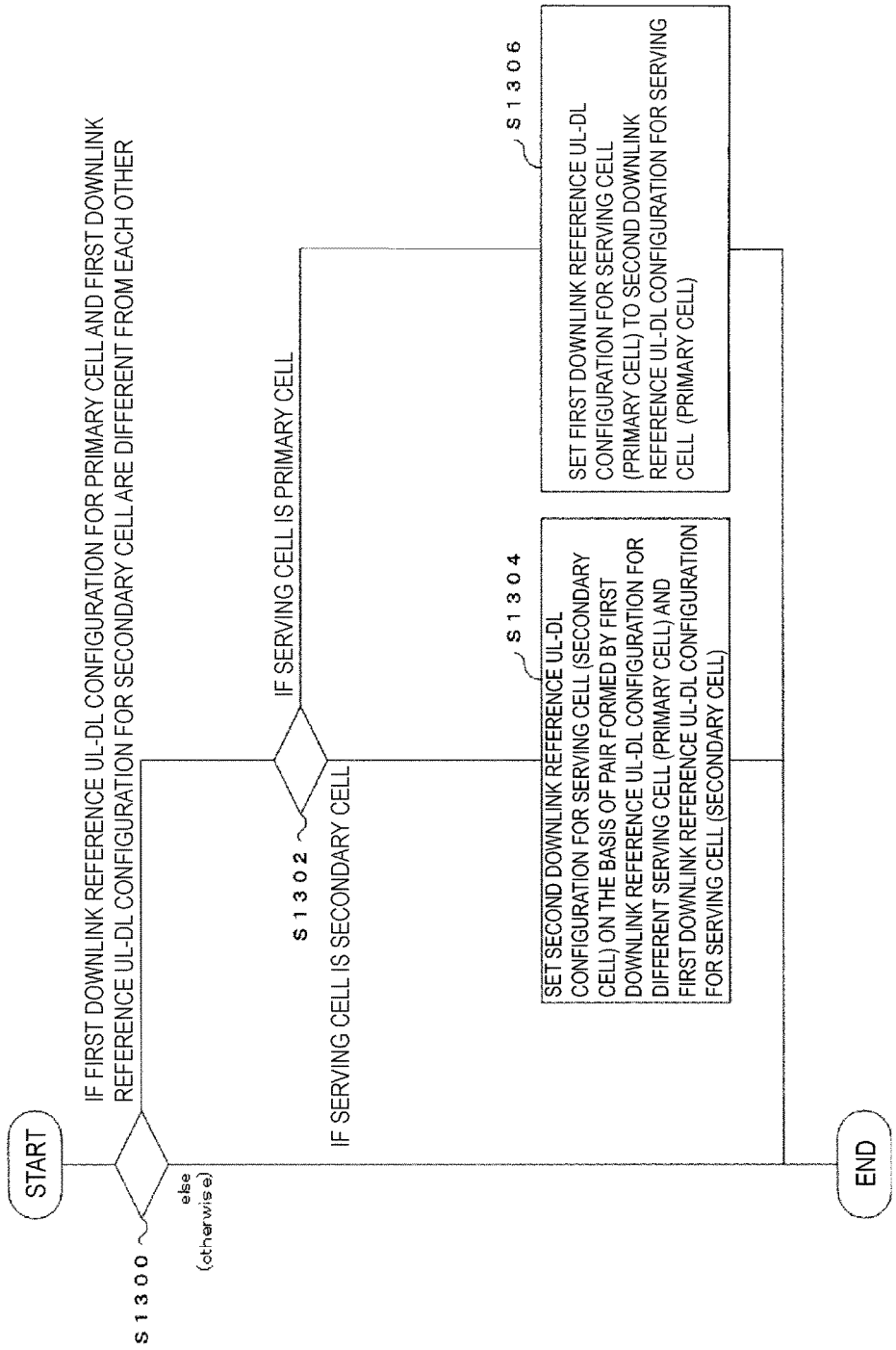
FIG. 13 is a flowchart illustrating a method of setting a second downlink reference UL-DL configuration according to the present embodiment.

FIG. 13 is a flowchart illustrating a method of setting the second downlink reference UL-DL configuration according to the present embodiment. In FIG. 13, one primary cell and one secondary cell are set for the mobile station device 1. The mobile station device 1 performs the setting method illustrated in FIG. 13 for each of the primary cell and the secondary cell.

The mobile station device 1 determines whether or not the first downlink reference UL-DL configuration for the primary cell and the first downlink reference UL-DL configuration for the secondary cell are different from each other (S1300). In a case where the first downlink reference UL-DL configuration for the primary cell and the first downlink reference UL-DL configuration for the secondary cell are the same, the mobile station device 1 terminates the process of setting the second downlink reference UL-DL configuration, without setting the second downlink reference UL-DL configuration.

In a case where the first downlink reference UL-DL configuration for the primary cell and the first downlink reference UL-DL configuration for the secondary cell are different from each other, the mobile station device 1 determines whether the serving cell is a primary cell or a secondary cell (S1302).

In a case where the serving cell is a secondary cell, the second uplink reference UL-DL configuration for the serving cell (the secondary cell) is set on the basis of the pair formed by the first downlink reference UL-DL configuration for the different serving cell (the primary cell) and the first downlink reference UL-DL configuration for the serving cell (the secondary cell) (S1304).

In S1304, the mobile station device 1 sets the second downlink reference UL-DL configuration for the serving cell (the secondary cell) on the basis of the table in FIG. 14. FIG. 14 is a diagram illustrating a correspondence between a pair formed by the first downlink reference UL-DL configuration for the primary cell and the first downlink reference UL-DL configuration for the secondary cell, and the second downlink reference UL-DL configuration for the secondary cell, according to the present embodiment.

In FIG. 14, the primary cell UL-DL configuration refers to the first downlink reference UL-DL configuration for the primary cell. In FIG. 14, the secondary cell UL-DL configuration refers to the first downlink reference UL-DL configuration for the secondary cell.

In a case where the pair formed by the first downlink reference UL-DL configuration for the primary cell and the first downlink reference UL-DL configuration for the secondary cell belongs to set 1 in FIG. 14, the second downlink reference UL-DL configuration for the secondary cell is defined in set 1.

In a case where the mobile station device 1 is not set so as to monitor the PDCCH/EPDCCH with the CIF corresponding to the secondary cell, in the primary cell, and the pair formed by the first downlink reference UL-DL configuration for the primary cell and the first downlink reference UL-DL configuration for the secondary cell belongs to set 2 in FIG. 14, the second downlink reference UL-DL configuration for the secondary cell is defined in set 2.

In a case where the mobile station device 1 is not set so as to monitor the PDCCH/EPDCCH with the CIF corresponding to the secondary cell, in the primary cell, and the pair formed by the first downlink reference UL-DL configuration for the primary cell and the first downlink reference UL-DL configuration for the secondary cell belongs to set 3 in FIG. 14, the second downlink reference UL-DL configuration for the secondary cell is defined in set 3.

In a case where the mobile station device 1 is set so as to monitor the PDCCH/EPDCCH with the CIF corresponding to the secondary cell, in the primary cell, and the pair formed by the first downlink reference UL-DL configuration for the primary cell and the first downlink reference UL-DL configuration for the secondary cell belongs to set 4 in FIG. 14, the second downlink reference UL-DL configuration for the secondary cell is defined in set 4.

In a case where the mobile station device 1 is set so as to monitor the PDCCH/EPDCCH with the CIF corresponding to the secondary cell, in the primary cell, and the pair formed by the first downlink reference UL-DL configuration for the primary cell and the first downlink reference UL-DL configuration for the secondary cell belongs to set 5 in FIG. 14, the second downlink reference UL-DL configuration for the secondary cell is defined in set 5.

For example, in a case where first downlink reference UL-DL configuration 1 is set for the primary cell and first downlink reference UL-DL configuration 0 is set for the secondary cell, second downlink reference UL-DL configuration 1 is set for the secondary cell.

In a case where the serving cell is a primary cell, the first downlink reference UL-DL configuration for the serving cell (the primary cell) is set to the second downlink reference UL-DL configuration for the serving cell (the primary cell) (S1306).

Moreover, the base station device 3 also sets the second downlink reference UL-DL configuration in accordance with the setting method in FIG. 13.

The first uplink reference UL-DL configuration will be described below.

The first uplink reference UL-DL configuration is at least used to specify a subframe that is available or is not available for the uplink transmission in the serving cell.

The mobile station device 1 does not perform the uplink transmission in a subframe indicated as a downlink subframe by the first uplink reference UL-DL configuration. The mobile station device 1 does not perform the uplink transmission in the DwPTS and the GP of a subframe indicated as a special subframe by the first uplink reference UL-DL configuration.

The first downlink reference UL-DL configuration will be described below.

The first downlink reference UL-DL configuration is at least used to specify a subframe that is available or is not available for the downlink transmission in the serving cell.

The mobile station device 1 does not perform the downlink transmission in a subframe indicated as an uplink subframe by the first downlink reference UL-DL configuration. The mobile station device 1 does not perform the downlink transmission in the UpPTS and the GP of a subframe indicated as a special subframe by the first downlink reference UL-DL configuration.

The mobile station device 1 for which the first downlink reference UL-DL configuration is set on the basis of the first information may also perform measurement (for example, measurement relating to channel state information) that uses a downlink signal in the downlink subframe or in the DwPTS of the special subframe indicated by the first uplink reference UL-DL configuration or the first downlink reference UL-DL configuration.

The base station device 3 determines a downlink reference UL-DL configuration from a configuration set (a set of configurations) limited on the basis of the first uplink reference UL-DL configuration. To be more precise, the first downlink reference UL-DL configuration is an element in the configuration set limited on the basis of the first uplink reference UL-DL configuration. The configuration set limited on the basis of the first uplink reference UL-DL configuration includes uplink-downlink configurations satisfying the following conditions (a) to (c). FIG. 15 is a diagram illustrating a relationship between the subframe indicated by the first uplink reference UL-DL configuration and the subframe indicated by the first downlink reference UL-DL configuration, according to the present embodiment. In FIG. 15, D denotes a downlink subframe, U denotes an uplink subframe, and S denotes a special subframe.

Condition (a): A subframe indicated as a downlink subframe by the first uplink reference UL-DL configuration is indicated as a downlink subframe.

Condition (b): A subframe indicated as an uplink subframe by the first uplink reference UL-DL configuration is indicated as an uplink subframe or a downlink subframe.

Condition (c): A subframe indicated as a special subframe by the first uplink reference UL-DL configuration is indicated as a downlink subframe or a special subframe.

Accordingly, since the subframe indicated as a downlink subframe by the first uplink reference UL-DL configuration and the DwPTS of the special subframe are not used for the uplink transmission, the mobile station device 1 for which the first downlink reference UL-DL configuration is set on the basis of the first information can appropriately perform the measurement using the downlink signal, in the dynamic TDD.

Moreover, the mobile station device 1 for which the first downlink reference UL-DL configuration is set on the basis of the second information may also perform the measurement (for example, the measurement relating to channel state information) using the downlink signal in the downlink subframe or in the DwPTS of the special subframe indicated by the first uplink reference UL-DL configuration.

The subframe indicated as an uplink subframe by the first uplink reference UL-DL configuration and indicated as a downlink subframe by the first downlink reference UL-DL configuration is also referred to as a first flexible subframe. The first flexible subframe is a subframe reserved for uplink and downlink transmission.

The subframe indicated as a special subframe by the first uplink reference UL-DL configuration and indicated as a downlink subframe by the first downlink reference UL-DL configuration is also referred to as a second flexible subframe. The second flexible subframe is a subframe reserved for downlink transmission. The second flexible subframe is a subframe reserved for downlink transmission in the DwPTS and uplink transmission in the UpPTS.

The transmission direction UL-DL configuration will be described in detail below.

The mobile station device 1 and the base station device 3 set the transmission direction UL-DL configuration relating to a transmission direction (uplink/downlink) of a subframe. The transmission direction UL-DL configuration is used to determine a transmission direction of the subframe.

The mobile station device 1 controls transmission in the first flexible subframe and transmission in the second flexible subframe on the basis of the scheduling information (the DCI format and/or the HARQ-ACK) and the transmission direction UL-DL configuration.

The base station device 3 transmits the third information indicating the transmission direction UL-DL configuration, to the mobile station device 1. The third information is information indicating a subframe available for uplink transmission. The third information is information indicating a subframe available for downlink transmission. The third information is information indicating a subframe available for uplink transmission in the UpPTS and for downlink transmission in the DwPTS.

For example, the transmission direction UL-DL configuration is used to specify the transmission direction, in a subframe indicated as an uplink subframe by the first uplink reference UL-DL configuration and indicated as a downlink subframe by the first downlink reference UL-DL configuration, and/or in a subframe indicated as a special subframe by the first uplink reference UL-DL configuration and indicated as a downlink subframe by the first downlink reference UL-DL configuration. To be more precise, the transmission direction UL-DL configuration is used to specify the transmission direction in the subframe indicated as a subframe that changes between the first uplink reference UL-DL configuration and the first downlink reference UL-DL configuration.

FIG. 16 is a diagram illustrating a relationship among the subframes indicated by the first uplink reference UL-DL configuration, the subframe indicated by the first downlink reference UL-DL configuration, and the subframe indicated by the transmission direction UL-DL configuration, according to the present embodiment. In FIG. 16, D denotes a downlink subframe, U denotes an uplink subframe, and S denotes a special subframe.

The base station device 3 determines a transmission direction UL-DL configuration from the configuration set (the set of configurations) limited on the basis of the first uplink reference UL-DL configuration and the first downlink reference UL-DL configuration. To be more precise, the transmission direction UL-DL configuration is an element in the configuration set limited on the basis of the first uplink reference UL-DL configuration and the first downlink reference UL-DL configuration. The configuration set limited on the basis of the first uplink reference UL-DL configuration and the first downlink reference UL-DL configuration includes uplink-downlink configurations satisfying the following conditions (d) to (h).

Condition (d): A subframe indicated as a downlink subframe by the first uplink reference UL-DL configuration and the first downlink reference UL-DL configuration is indicated as a downlink subframe.

Condition (e): A subframe indicated as an uplink subframe by the first uplink reference UL-DL configuration and the first downlink reference UL-DL configuration is indicated as an uplink subframe.

Condition (f): A subframe indicated as an uplink subframe by the first uplink reference UL-DL configuration while being indicated as a downlink subframe by the first downlink reference UL-DL configuration, is indicated as an uplink subframe or a downlink subframe.

Condition (g): A subframe indicated as a special subframe by the first uplink reference UL-DL configuration and the first downlink reference UL-DL configuration is indicated as a special subframe.

Condition (h): A subframe indicated as a special subframe by the first uplink reference UL-DL configuration while being indicated as a downlink subframe by the first downlink reference UL-DL configuration is indicated as a special subframe or a downlink subframe.

The base station device 3 may schedule downlink transmission in a subframe indicated as a downlink subframe by the transmission direction UL-DL configuration.

The mobile station device 1 may perform the process of receiving a downlink signal in a subframe indicated as a downlink subframe by the transmission direction UL-DL configuration. The mobile station device 1 may monitor the PDCCH/EPDCCH in a subframe indicated as a downlink subframe by the transmission direction UL-DL configuration. The mobile station device 1 may perform the process of receiving the PDSCH in a subframe indicated as a downlink subframe by the transmission direction UL-DL configuration, on the basis of detection of a downlink grant on the PDCCH/EPDCCH.

Furthermore, in a case where the transmission of the uplink signal (the PUSCH/SRS) in a subframe indicated as a downlink subframe by the transmission direction UL-DL configuration is scheduled or set, the mobile station device 1 does not perform the process of transmitting the uplink signal (the PUSCH/SRS) in the subframe.

The base station device 3 may schedule the uplink transmission in a subframe indicated as an uplink subframe by the transmission direction UL-DL configuration.

The base station device 3 may schedule the downlink transmission in a subframe indicated as an uplink subframe by the transmission direction UL-DL configuration. The scheduling of the downlink transmission by the base station device 3 may be prohibited in any subframe indicated as an uplink subframe by the transmission direction UL-DL configuration.

The mobile station device 1 may perform the process of transmitting an uplink signal in a subframe indicated as an uplink subframe by the transmission direction UL-DL configuration. In a case where the transmission of the uplink signal (the PUSCH/DMRS/SRS) in a subframe indicated as an uplink subframe by the transmission direction UL-DL configuration is scheduled or set, the mobile station device 1 may perform the process of transmitting the uplink signal (the PUSCH/DMRS/SRS) in the subframe.

The mobile station device 1 may perform the process of receiving a downlink signal in a subframe that is indicated as an uplink subframe by the transmission direction UL-DL configuration and in which uplink transmission has not been scheduled. The process of receiving a downlink signal by the mobile station device 1 may be prohibited in any subframe indicated as an uplink subframe by the transmission direction UL-DL configuration.

The base station device 3 may schedule downlink transmission in the DwPTS of a subframe indicated as a special subframe by the transmission direction UL-DL configuration.

The mobile station device 1 may perform the process of receiving a downlink signal in the DwPTS of a subframe indicated as a special subframe by the transmission direction UL-DL configuration. The mobile station device 1 may monitor the PDCCH/EPDCCH in the DwPTS of a subframe indicated as a special subframe by the transmission direction UL-DL configuration. The mobile station device 1 may perform the process of receiving the PDSCH in the DwPTS of a subframe indicated as a special subframe by the transmission direction UL-DL configuration, on the basis of detection of a downlink grant on the PDCCH/EPDCCH.

In a case where transmission of the PUSCH in a subframe indicated as a special subframe by the transmission direction UL-DL configuration is scheduled or set, the mobile station device 1 does not perform the process of transmitting the PUSCH in the subframe.

In a case where transmission of the SRS in the UpPTS of a subframe indicated as a special subframe by the transmission direction UL-DL configuration is scheduled or set, the mobile station device 1 may perform the process of transmitting the SRS in the UpPTS of the subframe.

The CRS, the PDCCH, the PHICH, and/or the PCFICH need not be transmitted in the first flexible subframe indicated as a downlink subframe by the transmission UL-DL configuration. In this case, the EPDCCH and the PDSCH are transmitted in the first flexible subframe used as a downlink subframe.

The base station device 3 may control whether or not the CRS, the PDCCH, the PHICH, and/or the PCFICH are/is to be transmitted in the first flexible subframe indicated as a downlink subframe by the transmission direction UL-DL configuration. In this case, the base station device 3 transmits, to the mobile station device 1, a CRS parameter indicating whether or not the CRS, the PDCCH, the PHICH, and/or the PCFICH are/is to be transmitted in the first flexible subframe indicated as a downlink subframe by the transmission direction UL-DL configuration, and the mobile station device 1 sets the CRS parameter.

The CRS need not be transmitted in the GP and UpPTS fields of the second flexible subframe indicated as a downlink subframe by the transmission direction UL-DL configuration. The base station device 3 may control whether or not the CRS is to be transmitted in the second flexible subframe indicated as a downlink subframe by the transmission direction UL-DL configuration. In this case, on the basis of the CRS parameter, the mobile station device 1 may determine whether or not the CRS is to be transmitted in the GP and the UpPTS fields of the second flexible subframe indicated as a downlink subframe by the transmission direction UL-DL configuration.

FIG. 17 is a diagram illustrating a relationship among the first uplink reference UL-DL configuration, the first downlink reference UL-DL configuration, and the transmission direction UL-DL configuration, according to the present embodiment.

For example, in FIG. 17, in a case where the first uplink reference UL-DL configuration is 0, the first downlink reference UL-DL configuration is one in the set {0, 1, 2, 3, 4, 5, 6}. For example, in FIG. 17, in a case where the first uplink reference UL-DL configuration is 1, the first downlink reference UL-DL configuration is one in the set {1, 2, 4, 5}.

For example, in FIG. 17, in a case where the first uplink reference UL-DL configuration is 0 and the first downlink reference UL-DL configuration is 1, the transmission direction UL-DL configuration is one in the set {0, 1, 6}.

Moreover, the value of the first downlink reference UL-DL configuration may be the same as the value of the first uplink reference UL-DL configuration. However, since the mobile station device 1 that has not received the second information sets the same value as the value of the first uplink reference UL-DL configuration, as the first downlink reference UL-DL configuration, the value of the first downlink reference UL-DL configuration indicated by the second information is desirably not the same as the value of the first uplink reference UL-DL configuration indicated by the first information.

In a case where the value of the first uplink reference UL-DL configuration and the value of the first downlink reference UL-DL configuration are the same, the transmission direction UL-DL configuration need not be defined. Furthermore, in a case where the value of the first uplink reference UL-DL configuration and the value of the first downlink reference UL-DL configuration are the same, the same value as the value of the first uplink reference UL-DL configuration and the value of the first downlink reference UL-DL configuration may be set for the transmission direction UL-DL configuration.

The third information may be information indicating the transmission direction UL-DL configuration from the configuration set (the set of configurations) constituted according to the first uplink reference UL-DL configuration and the first downlink reference UL-DL configuration.

The first uplink reference UL-DL configuration and the second uplink reference UL-DL configuration will be described in detail below.

The first uplink reference UL-DL configuration and the second uplink reference UL-DL configuration are used to specify (select or determine) a correspondence between subframe n to which the PDCCH/EPDCCH/PHICH is allocated and subframe n+k to which the PUSCH is allocated, the PDCCH/EPDCCH/PHICH corresponding to the PUSCH.

In a case where one primary cell is set, or in a case where one primary cell and one secondary cell are set and the first uplink reference UL-DL configuration for the primary cell and the first uplink reference UL-DL configuration for the secondary cell are the same, the corresponding first uplink reference UL-DL configuration is used, in the serving cell (in each of the two serving cells in the latter case), to determine the correspondence between the subframe to which the PDCCH/EPDCCH/PHICH is allocated and the subframe to which the PUSCH is allocated, the PDCCH/EPDCCH/PHICH corresponding to the PUSCH.

In a case where one primary cell and one secondary cell are set and the first uplink reference UL-DL configuration for the primary cell and the first uplink reference UL-DL configuration for the secondary cell are different from each other, the corresponding second uplink reference UL-DL configuration is used, in each of the two serving cells, to determine the correspondence between the subframe to which the PDCCH/EPDCCH/PHICH is allocated and the subframe to which the PUSCH is allocated, the PDCCH/EPDCCH/PHICH corresponding to the PUSCH.

FIG. 18 is a diagram illustrating a correspondence between subframe n to which the PDCCH/EPDCCH/PHICH is allocated and subframe n+k to which the PUSCH is allocated, the PDCCH/EPDCCH/PHICH corresponding to the PUSCH, according to the present embodiment. The mobile station device 1 specifies (selects or determines) a value k in accordance with the table in FIG. 18.

In FIG. 18, in the case where one primary cell is set, or in the case where one primary cell and one secondary cell are set and the first uplink reference UL-DL configuration for the primary cell and the first uplink reference UL-DL configuration for the secondary cell are the same, the uplink-downlink configuration refers to the first uplink reference UL-DL configuration.

In FIG. 18, in the case where one primary cell and one secondary cell are set and the first uplink reference UL-DL configuration for the primary cell and the first uplink reference UL-DL configuration for the secondary cell are different from each other, the uplink-downlink configuration refers to the second uplink reference UL-DL configuration.

The first uplink reference UL-DL configuration and the second uplink reference UL-DL configuration will be hereinafter referred to simply as an uplink-downlink configuration in the description referring to FIG. 18.

In a case where the PDCCH/EPDCCH with an uplink grant that corresponds to the serving cell for which any of uplink-downlink configurations 1 to 6 is set and that is destined for the mobile station device 1 is detected in subframe n, the mobile station device 1 performs PUSCH transmission in accordance with the uplink grant in subframe n+k specified (selected or determined) on the basis of the table in FIG. 18.

In a case where the PHICH with the NACK that corresponds to the serving cell for which any of uplink-downlink configurations 1 to 6 is set and that is destined for the mobile station device 1 is detected in subframe n, the mobile station device 1 performs the PUSCH transmission in subframe n+k specified (selected or determined) on the basis of the table in FIG. 18.

A two-bit uplink index (UL index) is included in an uplink grant that corresponds to the serving cell for which uplink-downlink configuration 0 is set and that is destined for the mobile station device 1. An uplink index (UL index) is not included in any uplink grant that corresponds to the serving cell for which any of uplink-downlink configurations 1 to 6 is set and that is destined for the mobile station device 1.

In a case where the most significant bit (MSB) of the uplink index is set to one in subframe n, the uplink index being included in the uplink grant corresponding to the serving cell for which uplink-downlink configuration 0 is set, the mobile station device 1 adjusts the PUSCH transmission in accordance with the uplink grant in subframe n+k specified (selected or determined) on the basis of the table in FIG. 18.

In a case where the PHICH with a NACK is received in a first resource set in subframe n=0 or 5, the PHICH corresponding to the serving cell for which uplink-downlink configuration 0 is set, the mobile station device 1 adjusts the PUSCH transmission in accordance with the PHICH in subframe n+k specified (selected or determined) on the basis of the table in FIG. 18.

In a case where the least significant bit (LSB) of the uplink index is set to one in subframe n, the uplink index being included in the uplink grant corresponding to the serving cell for which uplink-downlink configuration 0 is set, the mobile station device 1 adjusts the PUSCH transmission in accordance with the uplink grant in subframe n+7.

In a case where the PHICH with a NACK is received in a second resource set in subframe n=0 or 5, the PHICH corresponding to the serving cell for which the uplink-downlink configuration 0 is set, the mobile station device 1 adjusts the PUSCH transmission in accordance with the uplink grant in subframe n+7.

In a case where the PHICH with a NACK is received in subframe n=1 or 6, the PHICH corresponding to the serving cell for which uplink-downlink configuration 0 is set, the mobile station device 1 adjusts the PUSCH transmission in accordance with the uplink grant in subframe n+7.

For example, in a case where the PDCCH/EPDCCH/PHICH is detected in [SFN=m, subframe 1], the PDCCH/EPDCCH/PHICH corresponding to the serving cell for which uplink-downlink configuration 0 is set, the mobile station device 1 adjusts the PUSCH transmission in a subframe [SFN=m, subframe 7], which appears six subframes later.

The first uplink reference UL-DL configuration and the second uplink reference UL-DL configuration are used to specify (select or determine) the correspondence between subframe n to which the PHICH is allocated and subframe n−k to which the PUSCH is allocated, the PHICH corresponding to the PUSCH.

In the case where one primary cell is set, or in the case where one primary cell and one secondary cell are set and the first uplink reference UL-DL configuration for the primary cell and the first uplink reference UL-DL configuration for the secondary cell are the same, the corresponding first uplink reference UL-DL configuration is used, in the serving cell (in each of the two serving cells in the latter case), to specify (select or determine) the correspondence between subframe n to which the PHICH is allocated and subframe n−k to which the PUSCH is allocated, the PHICH corresponding to the PUSCH.

In the case where one primary cell and one secondary cell are set and the first uplink reference UL-DL configuration for the primary cell and the first uplink reference UL-DL configuration for the secondary cell are different from each other, the corresponding second uplink reference UL-DL configuration is used, in each of the two serving cells, to specify (select or determine) the correspondence between subframe n to which the PHICH is allocated and subframe n−k to which the PUSCH is allocated, the PHICH corresponding to the PUSCH.

FIG. 19 is a diagram illustrating the correspondence between subframe n to which the PHICH is allocated and subframe n−k to which the PUSCH is allocated, the PHICH corresponding to the PUSCH, according to the present embodiment. The mobile station device 1 specifies (selects or determines) a value k in accordance with the table in FIG. 19.

In FIG. 19, in the case where one primary cell is set, or in the case where one primary cell and one secondary cell are set and the first uplink reference UL-DL configuration for the primary cell and the first uplink reference UL-DL configuration for the secondary cell are the same, the uplink-downlink configuration refers to the first uplink reference UL-DL configuration.

In FIG. 19, in the case where one primary cell and one secondary cell are set and the first uplink reference UL-DL configuration for the primary cell and the first uplink reference UL-DL configuration for the secondary cell are different from each other, the uplink-downlink configuration refers to the second uplink reference UL-DL configuration.

The first uplink reference UL-DL configuration and the second uplink reference UL-DL configuration will be hereinafter referred to simply as an uplink-downlink configuration in the description referring to FIG. 19.

For the serving cell for which any of uplink-downlink configurations 1 to 6 is set, the HARQ indicator (the HARQ-ACK) to be received in subframe n on the PHICH corresponding to the serving cell relates to the PUSCH transmission in subframe n−k specified on the basis of the table in FIG. 19.

For the serving cell for which the uplink-downlink configuration 0 is set, the HARQ indicator (the HARQ-ACK) to be received in the first resource set in subframe n=0 or 5 or in subframe n=1 or 6 on the PHICH corresponding to the serving cell relates to the PUSCH transmission in subframe n−k specified on the basis of the table in FIG. 19.

For the serving cell for which uplink-downlink configuration 0 is set, the HARQ indicator (the HARQ-ACK) to be received in the second resource set in subframe n=0 or 5 on the PHICH corresponding to the serving cell relates to the PUSCH transmission in subframe n−6.

For example, for the serving cell for which the uplink-downlink configuration 1 is set, the HARQ indicator (the HARQ-ACK) to be received in [SFN=m, subframe 1] on the PHICH relates to the PUSCH transmission in the subframe [SFN=m−1, subframe 7] appearing four subframes earlier.

The first uplink reference UL-DL configuration and the second uplink reference UL-DL configuration are used to specify (select or determine) the correspondence between subframe n to which the PUSCH is allocated and subframe n+k to which the PHICH is allocated, the PUSCH corresponding to the PHICH.

In the case where one primary cell is set, or in the case where one primary cell and one secondary cell are set and the first uplink reference UL-DL configuration for the primary cell and the first uplink reference UL-DL configuration for the secondary cell are the same, the corresponding first uplink reference UL-DL configuration is used, in the serving cell (in each of the two serving cells in the latter case), to specify (select or determine) the correspondence between subframe n to which the PUSCH is allocated and subframe n+k to which the PHICH is allocated, the PUSCH corresponding to the PHICH.

In the case where one primary cell and one secondary cell are set and the first uplink reference UL-DL configuration for the primary cell and the first uplink reference UL-DL configuration for the secondary cell are different from each other, the corresponding second uplink reference UL-DL configuration is used, in each of the two serving cells, to specify (select or determine) the correspondence between subframe n to which the PUSCH is allocated and subframe n+k to which the PHICH is allocated, the PUSCH corresponding to the PHICH.

FIG. 20 is a diagram illustrating a correspondence between subframe n to which the PUSCH is allocated and subframe n+k to which the PHICH is allocated, the PUSCH corresponding to the PHICH, according to the present embodiment. The mobile station device 1 specifies (selects or determines) a value k in accordance with the table in FIG. 20.

In FIG. 20, in the case where one primary cell is set, or in the case where one primary cell and one secondary cell are set and the first uplink reference UL-DL configuration for the primary cell and the first uplink reference UL-DL configuration for the secondary cell are the same, the uplink-downlink configuration refers to the first uplink reference UL-DL configuration.

In FIG. 20, in the case where one primary cell and one secondary cell are set and the first uplink reference UL-DL configuration for the primary cell and the first uplink reference UL-DL configuration for the secondary cell are different from each other, the uplink-downlink configuration refers to the second uplink reference UL-DL configuration.

The first uplink reference UL-DL configuration and the second uplink reference UL-DL configuration will be hereinafter referred to simply as an uplink-downlink configuration in the description referring to FIG. 20.

In a case where the PUSCH transmission is scheduled in subframe n, the mobile station device 1 determines a PHICH resource in subframe n+k specified in accordance with the table in FIG. 20.

For example, in a case where the PUSCH transmission is scheduled in [SFN=m, subframe n=2] for the serving cell for which uplink-downlink configuration 0 is set, the PHICH resource is determined in [SFN=m, subframe n=6].

The first downlink reference UL-DL configuration and the second downlink reference UL-DL configuration will be described in detail below.

The first downlink reference UL-DL configuration and the second downlink reference UL-DL configuration are used to specify (select or determine) the correspondence between subframe n to which the PDSCH is allocated and subframe n+k used to transmit the HARQ-ACK corresponding to the PDSCH.

In the case where one primary cell is set, or in the case where one primary cell and one secondary cell are set and the downlink reference UL-DL configuration for the primary cell and the first downlink reference UL-DL configuration for the secondary cell are the same, the corresponding first downlink reference UL-DL configuration is used, in the serving cell (in each of the two serving cells in the latter case), to specify (select or determine) the correspondence between subframe n to which the PDSCH is allocated and subframe n+k used to transmit the HARQ-ACK corresponding to the PDSCH.

In the case where one primary cell and one secondary cell are set and the first downlink reference UL-DL configuration for the primary cell and the first downlink reference UL-DL configuration for the secondary cell are different from each other, the corresponding second downlink reference UL-DL configuration is used, in each of the two serving cells, to specify (select or determine) the correspondence between subframe n to which the PDSCH is allocated and subframe n+k used to transmit the HARQ-ACK corresponding to the PDSCH.

FIG. 21 is a diagram illustrating a correspondence between subframe n−k to which the PDSCH is allocated and subframe n used to transmit the HARQ-ACK that the PDSCH corresponds to, according to the present embodiment. The mobile station device 1 specifies (selects or determines) a value k in accordance with the table in FIG. 21.

In FIG. 21, in the case where one primary cell is set, or in the case where one primary cell and one secondary cell are set and the first downlink reference UL-DL configuration for the primary cell and the first downlink reference UL-DL configuration for the secondary cell are the same, the uplink-downlink configuration refers to the first downlink reference UL-DL configuration.

In FIG. 21, in the case where one primary cell and one secondary cell are set and the first downlink reference UL-DL configuration for the primary cell and the first downlink reference UL-DL configuration for the secondary cell are different from each other, the uplink-downlink configuration refers to the second downlink reference UL-DL configuration.

The first downlink reference UL-DL configuration and the second downlink reference UL-DL configuration will be hereinafter referred to simply as the uplink-downlink configuration in the description referring to FIG. 21.

In a case where the PDSCH transmission, in response to which the corresponding HARQ-ACK is to be transmitted, destined for the mobile station device 1 is detected in subframe n−k (k is specified in accordance with the table in FIG. 21) in the serving cell, the mobile station device 1 transmits the HARQ-ACK in subframe n.

For example, the mobile station device 1 does not make any HARQ-ACK response to the PDSCH transmission used for transmission of the system information. For example, the mobile station device 1 makes an HARQ-ACK response to the PDSCH transmission scheduled by the DCI format with the CRC scrambled with the C-RNTI.

For example, the mobile station device 1 transmits HARQ-ACK in subframe n=2, in response to the PDSCH received in subframe n−6 and/or n−7 in the serving cell for which the uplink-downlink configuration 1 is set.

Moreover, the first downlink reference UL-DL configuration need not be defined for the serving cell that has not received the second information. In this case, the mobile station device 1 and the base station device 3 may perform a process, which is to be performed on the basis of the first downlink reference UL-DL configuration described above, on the basis of the first uplink reference UL-DL configuration (the serving cell UL-DL configuration). The serving cell that has not received the second information is a serving cell for which the dynamic TDD is not set.

For example, in a case where: one primary cell and one secondary cell are set; the second information for the secondary cell is received without the second information for the primary cell being received; the first uplink reference UL-DL configuration (the serving cell UL-DL configuration) for the primary cell and the first downlink reference UL-DL configuration for the secondary cell are different from each other; and the serving cell is the secondary cell, the second downlink reference UL-DL configuration for the serving cell (the secondary cell) may be set on the basis of the pair formed by the first uplink reference UL-DL configuration for the different serving cell (the primary cell) and the first downlink reference UL-DL configuration for the serving cell (the secondary cell).

For example, in a case where: one primary cell and one secondary cell are set; the second information for the secondary cell is received without the second information for the primary cell being received; and the first uplink reference UL-DL configuration (the serving cell UL-DL configuration) for the primary cell and the first downlink reference UL-DL configuration for the secondary cell are different from each other, the corresponding second downlink reference UL-DL configuration may be used, in each of the two serving cells, to specify (select or determine) the correspondence between subframe n to which the PDSCH is allocated and subframe n+k used to transmit the HARQ-ACK corresponding to the PDSCH.

For example, in a case where: one primary cell and one secondary cell are set; the second information for the secondary cell is received without the second information for the primary cell being received; and the first uplink reference UL-DL configuration (the serving cell UL-DL configuration) for the primary cell and the first downlink reference UL-DL configuration for the secondary cell are the same, the corresponding first uplink reference UL-DL configuration (the serving cell UL-DL configuration) may be used, in the primary cell, to specify (select or determine) the correspondence between subframe n to which the PDSCH is allocated and subframe n+k used to transmit the HARQ-ACK corresponding to the PDSCH, and the corresponding first downlink reference UL-DL configuration may be used, in the secondary cell, to specify (select or determine) the correspondence between subframe n to which the PDSCH is allocated and subframe n+k used to transmit the HARQ-ACK corresponding to the PDSCH.

For example, in the case where: one primary cell and one secondary cell are set; the second information for the secondary cell is received without the second information for the primary cell being received; and the first uplink reference UL-DL configuration (the serving cell UL-DL configuration) for the primary cell and the first downlink reference UL-DL configuration for the secondary cell are different from each other, the primary cell UL-DL configuration refers to the first uplink reference UL-DL configuration for the primary cell in FIGS. 12 and 14.

The CSI will be described in detail below.

The CSI includes a channel quality indicator (CQI), a rank indicator (RI), and a precoding matric indicator (PMI). The CQI expresses a combination of a modulation scheme and a coding rate for a single transport block to be transmitted on the PDSCH. The coding rate is derived from the amount of resources for the PDSCH and the size of a transport block.

FIG. 22 is a table showing the modulation scheme and the coding rate that correspond to a CQI index according to the present embodiment. The mobile station device 1 derives the highest CQI index from 1 to 15 in the table in FIG. 22 among those satisfying a condition that a single PDSCH transport block that is in compliance with a combination of the modulation scheme and the transport block size corresponding to the CQI index and is transmitted in a group of downlink physical resource blocks termed the CSI reference resource could be received with a transport block error probability not exceeding 0.1. In a case where CQI index 1 does not satisfy the above-described condition, the mobile station device 1 derives CQI index 0.

However, in a case where UL-DL configurations of a neighboring cell and a serving cell are different from each other, an interference state differs for one subframe to another. In consideration of this, according to the present embodiment, at least two subframe sets are defined, and the mobile station device 1 reports, to the base station device 3, the channel state information for each of the at least two subframe sets. Moreover, a subframe set is desirably configured on the basis of the interference state of the subframe.

Figure 23:
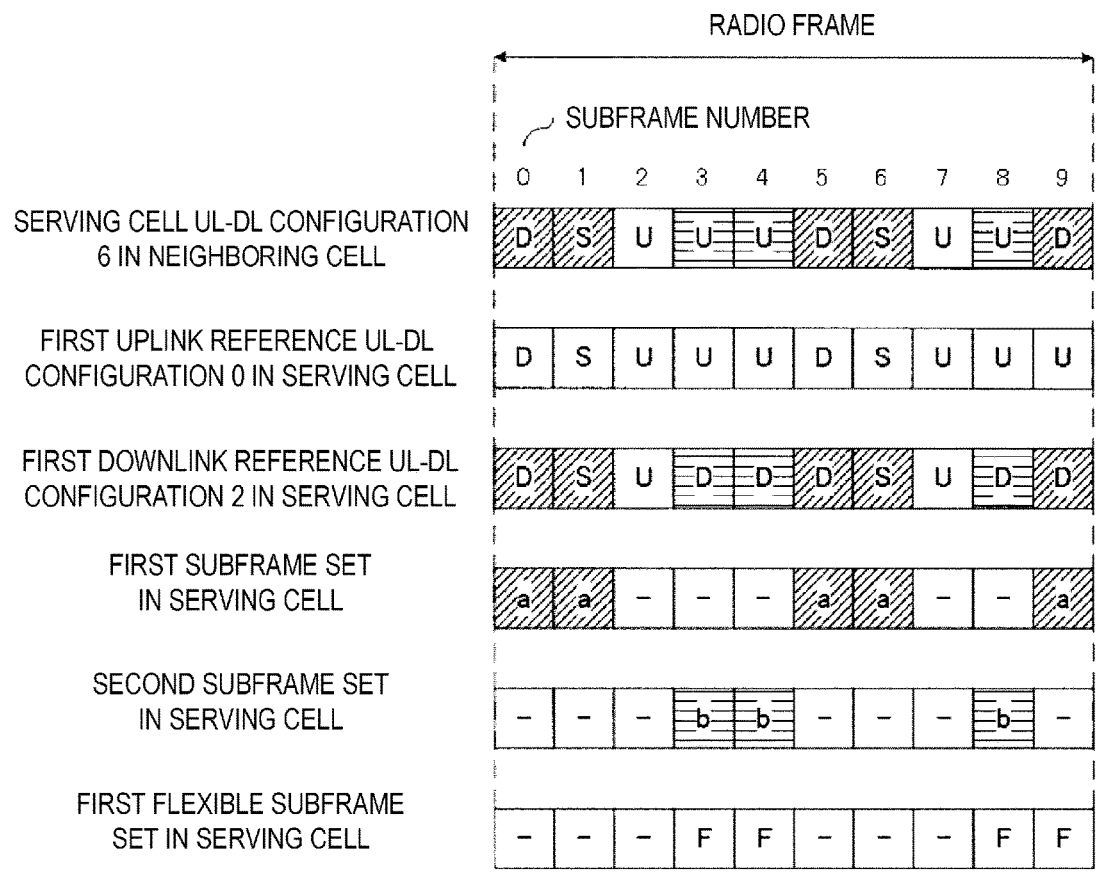
FIG. 23 is a diagram illustrating one example of a configuration of subframe sets according to the present embodiment.

FIG. 23 is a diagram illustrating one example of a configuration of the subframe sets according to the present embodiment. In FIG. 23, D denotes a downlink subframe, U denotes an uplink subframe, S denotes a special subframe, a denotes a subframe belonging to a first subframe set, b denotes a subframe belonging to a second subframe set, and F denotes a first flexible subframe.

In FIG. 23, downlink transmission is performed in subframes {0, 1, 3, 4, 5, 6, 8, 9} in the serving cell. Furthermore, in FIG. 23, downlink transmission is performed in subframes {0, 1, 5, 6, 9} in a neighboring cell, and uplink transmission is performed in subframes {3, 4, 8} in the neighboring cell. Therefore, in the serving cell, the interference state differs between subframes {0, 1, 5, 6, 9} and subframes {3, 4, 8}. Accordingly, in FIG. 23, the first subframe set is constituted of subframes {0, 1, 5, 6, 9} and the second subframe set is constituted of subframes {3, 4, 8}.

The base station device 3 transmits information indicating the subframe set to the mobile station device 1, and the mobile station device 1 may set a subframe set on the basis of the information.

Moreover, the subframe set may be implicitly configured on the basis of the first flexible subframe. For example, the first subframe set may be constituted of the first flexible subframes, and the second subframe set may be constituted of subframes indicated as a downlink subframe or a special subframe by the first uplink reference UL-DL configuration.

Moreover, a plurality of CSI processes may be set for the mobile station device 1. At least two subframe sets may be set for a single CSI process. Furthermore, at least two CSI processes may be set for the mobile station device 1, and one subframe set may be set for each of the at least two CSI processes.

The mobile station device 1 may derive CSI for each of the plurality of CSI processes and/or the plurality of subframe sets and report the CSI.

Moreover, the special subframe including a DwPTS that is equal to or less than 7680/(15000×2048) seconds in length may belong to none of the subframe sets.

The CSI is reported periodically or aperiodically. A CSI that is periodically reported is referred to as a periodic CSI. A CSI that is aperiodically reported is referred to as an aperiodic CSI.

A resource that is possibly used for the reporting of the CSI by the mobile station device 1 is controlled by the base station device 3.

The mobile station device 1 is semi-statically set by the higher layer (the RRC layer) so that the periodic CSI is periodically fed back on the PUCCH. To be more precise, for the mobile station device 1, the subframe to be used for the reporting of the periodic CSI is set by the higher layer (the RRC layer). The mobile station device 1 may be set to perform the reporting of the periodic CSI in each CSI process and/or each subframe set. In other words, the reporting of the periodic CSI is triggered on the basis of the configuration relating to the reporting of the periodic CSI set by the higher layer.

The aperiodic CSI is transmitted on the PUSCH. In a case where an uplink grant is detected in subframe n for the serving cell c and a CSI request field included in the uplink grant is set in such a manner as to trigger the CSI reporting, the mobile station device 1 reports the aperiodic CSI on the PUSCH scheduled by the uplink grant in subframe n+k in the serving cell c. In other words, the reporting of the aperiodic CSI is triggered in response to detection of information (the DCI format) including the CSI request field that is set in such a manner as to trigger the CSI reporting.

Information (a CSI request) indicating whether or not to instruct the mobile station device 1 to report the aperiodic CSI is mapped to the CSI request field. Furthermore, the information indicates the CSI process and/or the subframe set, and the mobile station device 1 may report the aperiodic CSI for each of the CSI process and/or the subframe set indicated by the information.

The mobile station device 1 derives a wideband CQI and a subband CQI. In the frequency domain, the wideband CQI corresponds to all the downlink physical resource blocks, and the subband CQI corresponds to some of the downlink physical resource blocks.

The CSI reference resource will be described below.

In the frequency domain, the CSI reference resource is defined by a group of physical resource blocks corresponding to a band to which the value of a CQI to be derived relates.

In the time domain, the CSI reference resource is defined by one subframe. In a case where the CSI is reported in subframe n, the CSI reference resource is defined by subframe n−nCQIref.

With respect to the reporting of the periodic CSI, nCQIref may be the smallest value that is equal to or greater than four so that subframe n−nCQIref corresponds to a valid subframe.

With respect to the reporting of the aperiodic CSI, nCQIref may be the smallest value that is equal to or greater than four so that subframe n−nCQIref corresponds to a valid subframe and subframe n−nCQIref appears later than valid subframe n−k in which the CSI request has been received.

With respect to the reporting of the aperiodic CSI, nCQIref may be four so that subframe n−nCQIref corresponds to a valid subframe and subframe n−nCQIref appears later than valid subframe n−k in which the CSI request has been received.

The mobile station device 1 regards the subframe satisfying at least the following conditions, as being valid. Moreover, the UL-DL configuration indicated by the first information is referred to as the UL-DL configuration of the serving cell.

Condition (X1): For the reporting of the periodic CSI, in a period (radio frame) in which the transmission direction UL-DL configuration is not set, a valid subframe is indicated as a downlink subframe by the UL-DL configuration of the serving cell.

Condition (X2): For the reporting of the periodic CSI, in a period (radio frame) in which the transmission direction UL-DL configuration is set, a valid subframe is indicated as a downlink subframe by the transmission direction UL-DL configuration.

Condition (X3): For the reporting of the aperiodic CSI, a valid subframe is indicated as a downlink subframe by the downlink reference UL-DL configuration.

Condition (X4): Except for transmission modes 9 and 10, a valid subframe is not an MBSFN subframe.

Condition (X5): A valid subframe does not include a DwPTS field having a length equal to or less than 7680/(15000×2048) seconds.

Condition (X6): A valid subframe is not included in a measurement gap set for the mobile station device 1.

Condition (X7): In a case where the subframe sets are set for the mobile station device 1, a valid subframe is an element of the subframe set to which the CSI reporting corresponds.

Moreover, the downlink subframe in condition (X1), condition (X2), and condition (X3) includes a special subframe.

Moreover, in a case where a plurality of cells with different UL-DL configurations are aggregated and the mobile station device 1 is not capable of simultaneous reception and transmission in the aggregated cells, the downlink subframes in condition (X1), condition (X2), and condition (X3) include a downlink subframe in the primary cell and a special subframe including a DwPTS field having a length greater than 7680/(15000×2048) seconds.

Moreover, each of the CSI reference resources for a certain serving cell belongs to one subframe set and does not belong to a plurality of subframe sets.

FIG. 24 is a diagram illustrating an example of a CSI reference resource corresponding to reporting of a periodic CSI according to the present embodiment.

FIG. 25 is a diagram illustrating an example of a CSI reference resource corresponding to reporting of an aperiodic CSI according to the present embodiment.

In FIG. 24 and FIG. 25, each square denoted by a indicates a subframe belonging to the first subframe set, and each square denoted by b indicates a subframe belonging to the second subframe set. In FIG. 24 and FIG. 25, uplink reference UL-DL configuration 0 and downlink reference UL-DL configuration 5 are set. In FIG. 24, transmission direction UL-DL configuration 1 valid for radio frame 0 is detected (set) while the transmission direction UL-DL configuration valid for radio frame 1 is not detected (set).

In FIG. 24, the square denoted by P is a subframe used for reporting of a periodic CSI corresponding to the second subframe set, and the square denoted by R indicates a CSI reference resource corresponding to the reporting of the periodic CSI.

In FIG. 24, a subframe that appears four or more subframes before the subframe used for the reporting of the periodic CSI, that belongs to the second subframe set, and that satisfies condition (X1) or condition (X2), is subframe 4 within radio frame 0. In other words, in FIG. 24, subframe 4 within radio frame 0 is a CSI reference resource.

In FIG. 25, the square denoted by G indicates a subframe in which an uplink grant including a CSI request set so as to trigger the reporting of channel state information corresponding to the second subframe set is detected, and the square denoted by A indicates a subframe used for the reporting of a periodic CSI corresponding to the second subframe set, and the square denoted by R indicates a CSI reference resource corresponding to the reporting of the aperiodic CSI.

In FIG. 25, a subframe that appears four or more subframes before the subframe used for the reporting of the aperiodic CSI, that is the same as or appears later than a subframe in which an uplink grant including a CSI request set so as to trigger reporting of channel state information is detected, that belongs to the second subframe set, and that satisfies condition (X3), is subframe 8 within radio frame 0. In other words, in FIG. 25, subframe 8 within radio frame 0 is a CSI reference resource.

Instead of condition (X3), condition (X1) and condition (X2) may be applied to the reporting of the aperiodic CSI.

Moreover, in a case where a valid subframe is not available for the CSI reference resource, the mobile station device 1 may omit the CSI reporting.

Moreover, in the case where a valid subframe is not available for the CSI reference resource, the mobile station device 1 for which the downlink reference UL-DL configuration is set may report channel state information indicating a CQI index (for example, CQI index 0) predefined in the LTE specification or the like.

Moreover, in a case where: the CSI reference resource is indicated as a downlink subframe by the downlink reference UL-DL configuration; and the CSI reference resource is indicated as an uplink subframe by the uplink reference UL-DL configuration and the transmission direction UL-DL configuration, the mobile station device 1 may report channel state information indicating a CQI index (for example, CQI index 0) predefined in the LTE specification or the like. In other words, the mobile station device 1 need not measure CSI in this case.

Moreover, in a case where: the CSI reference resource is indicated as an uplink subframe by the uplink reference UL-DL configuration; and the CSI reference resource is indicated as a downlink subframe by the downlink reference UL-DL configuration, and has no valid transmission direction UL-DL configuration set therefor, the mobile station device 1 may report channel state information indicating a CQI index (for example, CQI index 0) predefined in the LTE specification or the like. In other words, the mobile station device 1 need not measure CSI in this case.

In a case where, for the reporting of the aperiodic CSI, the CSI reference resource is a subframe appearing before the subframe used to receive the DCI format including the corresponding CSI request field, the mobile station device 1 may report channel state information indicating a CQI index (for example, CQI index 0) predefined in the LTE specification or the like. In other words, the mobile station device 1 need not measure CSI in this case.

The mobile station device 1 in transmission modes 1 to 8 performs channel measurement on the basis of the CRS in order to derive the CQI relating to the CSI reference resource.

The mobile station device 1 in transmission modes 9 and 10 performs channel measurement using an NZP CSI-RS resource corresponding to the CSI process, in order to derive the CQI relating to the CSI reference resource. The NZP CSI-RS resource may be set for each CSI process.

The mobile station device 1 in transmission mode 10 performs interference measurement using a CSI-IM resource corresponding to the CSI process, in order to derive the CQI relating to the CSI reference resource. In a case where at least two subframe sets are set for a single CSI process, the mobile station device 1 in transmission mode 10 performs the interference measurement using the CSI-IM resource within the subframe set to which the CSI reference resource belongs, in order to derive the CQI relating to the CSI reference resource.

In LTE, the transmission mode is controlled by the base station device 3.

For the purpose of deriving the CQI index, the mobile station device 1 makes at least the following assumptions for the CSI reference resource.

The mobile station device 1 assumes that the number of resource elements corresponding to the CRS is the same as that within a non-MB SFN subframe.

The mobile station device 1 assumes that the number of OFDM symbols occupied by a control signal including the PDCCH is three.

In a case where the NZP CSI-RS is used for the channel measurement, the mobile station device 1 assumes the CSI process and/or the ratio between PDSCH EPRE and NZP CSI-RS EPRE that is given by Pc corresponding to the subframe set. The ratio between the PDSCH EPRE and CRS EPRE is given by PA.

In a case where the CRS is used for the channel measurement, the mobile station device 1 assumes $\Delta$offset that is common to the subframe sets and the ratio between PDSCH EPRE and CRS EPRE that is given by PA corresponding to the subframe set.

A resource element is not used by any of the synchronization signal, the PBCH, and the EPDCCH.

The CP length of the non-MB SFN subframe.

Redundancy version 0.

No resource element is allocated to the NZP CSI-RS and the ZP CSI-RS.

No resource element is allocated to the PRS.

A PDSCH transmission scheme corresponding to the transmission mode currently set for the mobile station device 1.

(i) The mobile station device 1 according to the present embodiment includes: the setting unit 1013 that sets a first subframe set, a second subframe set, a first UL-DL configuration (uplink reference UL-DL configuration), a second UL-DL configuration (downlink reference UL-DL configuration), and a third UL-DL configuration (transmission direction UL-DL configuration); the measurement unit 1059 that performs interference measurement and/or channel measurement for calculating channel state information, in the first subframe set or the second subframe set to which a channel state information reference resource belongs; and the transmission unit 107 that reports periodic channel state information and aperiodic channel state information. For the reporting of periodic channel state information, a subframe valid as the channel state information reference resource satisfies a condition that the subframe corresponds to: a subframe, in a radio frame for which valid third UL-DL configuration is not set, indicated as a downlink subframe and a special subframe by the first UL-DL configuration; and a subframe, in a radio frame for which valid third UL-DL configuration is set, indicated as a downlink subframe and a special subframe by the third UL-DL configuration. For the reporting of aperiodic channel state information, a subframe valid as the channel state information reference resource satisfies a condition that the subframe corresponds to a subframe indicated as a downlink subframe and a special subframe by the second UL-DL configuration.

(ii) Moreover, the measurement unit 1059 according to the present embodiment performs interference measurement and/or channel measurement for calculating the periodic channel state information and the aperiodic channel state information in the subframe, in the radio frame for which valid third UL-DL configuration is not set, indicated as a downlink subframe and a special subframe by the first UL-DL configuration. Furthermore, the measurement unit 1059 according to the present embodiment performs interference measurement and/or channel measurement) for calculating the periodic channel state information and the aperiodic channel state information in the subframe, in the radio frame for which valid third UL-DL configuration is set, indicated as a downlink subframe and a special subframe by the third UL-DL configuration.

(iii) Moreover, in a case where the channel state information reference resource for the reporting of the aperiodic channel state information is the subframe indicated as an uplink subframe by the second UL-DL configuration and valid third UL-DL configuration is not set for the channel state information reference resource, the transmission unit 107 according to the present embodiment may report channel state information indicating out of range.

(iv) Moreover, in a case where: the first UL-DL configuration is set; the second UL-DL configuration is not set; and no valid downlink subframe is set for the channel state information reference resource, the transmission unit of the mobile station device 3 according to the present embodiment may omit the reporting of the channel state information. In a case where the first UL-DL configuration and the second UL-DL configuration are set and no valid downlink subframe is available for the channel state information reference resource, the transmission unit may report channel state information (indicating a CQI index (for example, out of range) predefined in the LTE specification or the like).

Accordingly, in a radio communication system in which the channel state information is used, the base station device 3 can efficiently communicate with the mobile station device 1.

A program running on each of the base station device 3 and the mobile station device 1 according to the present invention may be a program that controls a central processing unit (CPU) and the like (a program for causing a computer to operate) in such a manner as to realize the functions according to the above-described embodiment of the present invention. In this case, the information handled in these devices is temporarily stored in a random access memory (RAM) while being processed. Thereafter, the information is stored in various types of read only memory (ROM) such as a flash ROM or a hard disk drive (HDD) and when necessary, is read by the CPU to be modified or rewritten.

Moreover, the mobile station device 1 and the base station device 3 according to the above-described embodiment may be partially realized by the computer. This configuration may be realized by recording a program for realizing such control functions on a computer-readable medium and causing a computer system to read the program recorded on the recording medium for execution.

Moreover, the "computer system" here is defined as a computer system built into the mobile station device 1 or the base station device 3 and, the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 3 according to the above-described embodiment can be realized as an aggregation (a device group) constituted of a plurality of devices. Devices constituting the device group may be each equipped with some or all portions of each function or each functional block of the base station device 3 according to the above-described embodiment. It is only required that the device group itself include general functions or general functional blocks of the base station device 3. Furthermore, the mobile station device 1 according to the above-described embodiment can also communicate with the base station device as the aggregation.

Furthermore, the base station device 3 according to the above-described embodiment may be an evolved universal terrestrial radio access network (E-UTRAN). Furthermore, the base station device 3 according to the above-described embodiment may have some or all portions of a function of a node higher than an eNodeB.

Furthermore, some or all portions of each of the mobile station device 1 and the base station device 3 according to the above-described embodiment may be realized as an LSI that is a typical integrated circuit or may be realized as a chip set. The functional blocks of each of the mobile station device 1 and the base station device 3 may be individually realized as chip, or some or all of the functional blocks may be integrated into a chip. Furthermore, a circuit integration technique is not limited to the LSI, and the integrated circuit for the functional block may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the mobile station device is described as one example of a terminal device or a communication device, but the present invention is not limited to this, and can be applied to a terminal apparatus or a communication apparatus, such as a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

INDUSTRIAL APPLICABILITY

The present invention is applicable to communication devices, such as mobile phones and smartphones, computers, electronic equipment, household devices, and the like.

REFERENCE SIGNS LIST 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SUBFRAME SETTING UNIT
1015 SCHEDULING INFORMATION INTERPRETATION UNIT
1017 CSI REPORT CONTROL UNIT
3011 RADIO RESOURCE CONTROL UNIT
3013 SUBFRAME SETTING UNIT
3015 SCHEDULING UNIT
3017 CSI REPORT CONTROL UNIT

The invention claimed is:

1. A terminal device that communicates with a base station device by using a single serving cell, the terminal device comprising:
a reception unit configured to receive first information indicating an uplink-downlink configuration, second information indicating an uplink-downlink configuration, third information indicating an uplink-downlink configuration, and an uplink grant including a channel state information request to be used to trigger aperiodic reporting of channel state information;
a measurement unit configured to derive an index of a channel quality indicator on the basis of a channel state information reference resource, for a value of the channel quality indicator to be reported in a subframe n; and
a transmission unit configured to report the channel state information including the channel quality indicator, to transmit a physical uplink shared channel corresponding to detection of a physical downlink control channel, with reference to the uplink-downlink configuration indicated by the first information, and to transmit a hybrid automatic repeat request acknowledgement (HARQ-ACK) corresponding to detection of a physical downlink shared channel, with reference to the uplink-downlink configuration indicated by the second information;
wherein, in a time domain, the channel state information reference resource is defined by a subframe $n-n_{CQI\ ref}$;
for periodic reporting of the channel state information, the $n_{CQI\ ref}$ is a smallest value that is equal to or greater than four so that the subframe $n-n_{CQI\ ref}$ corresponds to a valid subframe;
for aperiodic reporting of the channel state information, the $n_{CQI\ ref}$ is four, the subframe $n-n_{CQI\ ref}$ corresponds to a valid subframe, and the subframe $n-n_{CQI\ ref}$ is later than a subframe n-k, the channel state information request corresponding to the subframe $n-n_{CQI\ ref}$ being received in the subframe n-k;
a subframe that satisfies criteria including at least a criterion (i) is regarded as being valid;
in the at least criterion (i), in a case where the third information for a radio frame is detected, the uplink-downlink configuration for the radio frame is given by the third information for the radio frame;
in the at least criterion (i), in a case where the third information for the radio frame is not detected, the uplink-downlink configuration for the radio frame is given by the first information;
in the at least criterion (i) stipulates that the subframe is a subframe indicated as a downlink subframe or a special subframe by the uplink-downlink configuration for the radio frame; and
in a case where a subframe n-4 is not the valid subframe for the aperiodic reporting of the channel state information, reporting of the channel state information is omitted in the subframe n.

2. A radio communication method used for a terminal device that communicates with a base station device by using a single serving cell, the radio communication method comprising:
receiving first information indicating an uplink-downlink configuration, second information indicating an uplink-downlink configuration, third information indicating an uplink-downlink configuration, and an uplink grant including a channel state information request to be used to trigger aperiodic reporting of channel state information;
deriving an index of a channel quality indicator on the basis of a channel state information reference resource, for a value of the channel quality indicator to be reported in a subframe n;
reporting the channel state information including the channel quality indicator;

transmitting a physical uplink shared channel corresponding to detection of a physical downlink control channel, with reference to the uplink-downlink configuration indicated by the first information; and transmitting a hybrid automatic repeat request acknowledgement (HARQ-ACK) corresponding to detection of a physical downlink shared channel, with reference to the uplink-downlink configuration indicated by the second information;

wherein, in a time domain, the channel state information reference resource is defined by a subframe $n-n_{CQI\_ref}$;

for periodic reporting of the channel state information, the $n_{CQI\_ref}$ is a smallest value that is equal to or greater than four so that the subframe $n-n_{CQI\_ref}$ corresponds to a valid subframe;

for aperiodic reporting of the channel state information, the $n_{CQI\_ref}$ is four, the subframe $n-n_{CQI\_ref}$ corresponds to a valid subframe, and the subframe $n-n_{CQI\_ref}$ is later than a subframe n−k, the channel state information request corresponding to the subframe $n-n_{CQI\_ref}$ being received in the subframe n−k;

a subframe that satisfies criteria including at least a criterion (i) is regarded as being valid;

in the at least criterion (i), in a case where the third information for a radio frame is detected, the uplink-downlink configuration for the radio frame is given by the third information for the radio frame;

in the at least criterion (i), in a case where the third information for the radio frame is not detected, the uplink-downlink configuration for the radio frame is given by the first information;

in the at least criterion (i) stipulates that the subframe is a subframe indicated as a downlink subframe or a special subframe by the uplink-downlink configuration for the radio frame; and in a case where a subframe n−4 is not the valid subframe for the aperiodic reporting of the channel state information, reporting of the channel state information is omitted in the subframe n.

3. An integrated circuit incorporated into a terminal device that communicates with a base station device by using a single serving cell, the integrated circuit comprising:

a processor; and a memory associated with the processor; wherein the processor executes instructions stored on the memory to cause the terminal device to perform a series of functions comprising:

receiving first information indicating an uplink-downlink configuration, second information indicating an uplink-downlink configuration, third information indicating an uplink-downlink configuration, and an uplink grant including a channel state information request to be used to trigger aperiodic reporting of channel state information;

deriving an index of a channel quality indicator on the basis of a channel state information reference resource, for a value of the channel quality indicator to be reported in a subframe n;

reporting the channel state information including the channel quality indicator;

transmitting a physical uplink shared channel corresponding to detection of a physical downlink control channel, with reference to the uplink-downlink configuration indicated by the first information; and transmitting a hybrid automatic repeat request acknowledgement (HARQ-ACK) corresponding to detection of a physical downlink shared channel, with reference to the uplink-downlink configuration indicated by the second information;

wherein, in a time domain, the channel state information reference resource is defined by a subframe $n-n_{CQI\_ref}$;

for periodic reporting of the channel state information, the $n_{CQI\_ref}$ is a smallest value that is equal to or greater than four so that the subframe $n-n_{CQI\_ref}$ corresponds to a valid subframe;

for aperiodic reporting of the channel state information, the $n_{CQI\_ref}$ is four, the subframe $n-n_{CQI\_ref}$ corresponds to a valid subframe, and the subframe $n-n_{CQI\_ref}$ is later than a subframe n−k, the channel state information request corresponding to the subframe $n-n_{CQI\_ref}$ being received in the subframe n−k;

a subframe that satisfies criteria including at least a criterion (i) is regarded as being valid;

in the at least criterion (i), in a case where the third information for a radio frame is detected, the uplink-downlink configuration for the radio frame is given by the third information for the radio frame;

in the at least criterion (i), in a case where the third information for the radio frame is not detected, the uplink-downlink configuration for the radio frame is given by the first information;

in the at least criterion (i) stipulates that the subframe is a subframe indicated as a downlink subframe or a special subframe by the uplink-downlink configuration for the radio frame; and in a case where a subframe n−4 is not the valid subframe for the aperiodic reporting of the channel state information, reporting of the channel state information is omitted in the subframe n.

* * * * *

UNITED STATES PATENT AND TRADEMARK OFFICE
CERTIFICATE OF CORRECTION

PATENT NO. : 9,876,624 B2
APPLICATION NO. : 15/119435
DATED : January 23, 2018
INVENTOR(S) : Shoichi Suzuki et al.

It is certified that error appears in the above-identified patent and that said Letters Patent is hereby corrected as shown below:

In the Claims

Claim 1 in Column 46, Line 43 should be amended to recite:
--"the at least criterion (i) stipulates that the subframe is"--

Claim 2 in Column 47, Line 32 should be amended to recite:
--"the at least criterion (i) stipulates that the subframe is"--

Claim 3 in Column 48, Line 42 should be amended to recite:
--"the at least criterion (i) stipulates that the subframe is"--

Signed and Sealed this
Thirty-first Day of July, 2018

Andrei Iancu
*Director of the United States Patent and Trademark Office*

Page 1 of 1